US009950756B2

(12) United States Patent
de Boe et al.

(10) Patent No.: US 9,950,756 B2
(45) Date of Patent: Apr. 24, 2018

(54) TRACK ASSEMBLY FOR AN OFF-ROAD VEHICLE

(71) Applicant: CAMOPLAST SOLIDEAL, INC., Quebec (CA)

(72) Inventors: Kris de Boe, Ghent (BE); Alain Lussier, Quebec (CA)

( * ) Notice: Subject to any disclaimer, the term of this patent is extended or adjusted under 35 U.S.C. 154(b) by 0 days.

(21) Appl. No.: 14/435,380

(22) PCT Filed: Oct. 11, 2013

(86) PCT No.: PCT/CA2013/000869
§ 371 (c)(1),
(2) Date: Apr. 13, 2015

(87) PCT Pub. No.: WO2014/056089
PCT Pub. Date: Apr. 17, 2014

(65) Prior Publication Data
US 2015/0344087 A1    Dec. 3, 2015

Related U.S. Application Data

(60) Provisional application No. 61/713,169, filed on Oct. 12, 2012.

(51) Int. Cl.
*B62D 55/14* (2006.01)
*B62D 55/10* (2006.01)
*B62D 55/24* (2006.01)

(52) U.S. Cl.
CPC .......... *B62D 55/14* (2013.01); *B62D 55/10* (2013.01); *B62D 55/244* (2013.01)

(58) Field of Classification Search
CPC ....... B62D 55/14; B62D 55/10; B62D 55/244

(Continued)

(56) References Cited

U.S. PATENT DOCUMENTS 1,336,130 A * 4/1920 Walter ................ B62D 55/108
180/9.44
2,443,126 A * 6/1948 Whitaker ................ G01B 3/18
33/813

(Continued)

FOREIGN PATENT DOCUMENTS

JP      S5539838          3/1980
JP      2001334969 A  * 12/2001
WO      WO9954189         10/1999

OTHER PUBLICATIONS

International Search Report dated Feb. 4, 2014 in connection with International Patent Application PCT/CA2013/000869, 2 pages.

(Continued)

*Primary Examiner* — S. Joseph Morano
*Assistant Examiner* — Jean Charleston
(74) *Attorney, Agent, or Firm* — Fish & Richardson P.C.

(57) ABSTRACT

A track assembly for traction of an off-road vehicle, the track assembly comprising a set of wheels and an endless track disposed around the set of wheels. The endless track comprises elastomeric material to flex around the set of wheels. The endless track comprises a plurality of drive/guide lugs projecting inwardly. The set of wheels comprises a drive wheel for imparting motion to the endless track. The set of wheels may comprise a first plurality of roller wheels for rolling on a first rolling path of the inner side and a second plurality of roller wheels for rolling on a second rolling path of the inner side such that the drive/guide lugs are located between the first rolling path and the second rolling path, as well as a third plurality of roller wheels for rolling on top of the drive/guide lugs.

35 Claims, 18 Drawing Sheets

(58) Field of Classification Search
USPC ....... 305/124, 128, 129, 130, 132, 137, 140, 305/142; 180/9.1, 9.26, 9.3
See application file for complete search history.

(56) References Cited

U.S. PATENT DOCUMENTS

| | | | | |
|---|---|---|---|---|
| 2,463,121 | A * | 3/1949 | Sapp | B64C 25/38 244/103 S |
| 4,647,116 | A * | 3/1987 | Trask | B60K 17/02 305/132 |
| 4,781,257 | A * | 11/1988 | Gee | B62D 55/08 180/9.5 |
| 5,293,948 | A * | 3/1994 | Crabb | B62D 55/08 180/9.1 |
| 5,494,125 | A | 2/1996 | Gustin et al. | |
| 5,899,543 | A * | 5/1999 | Lykken | B62D 55/1086 180/9.54 |
| 6,129,426 | A | 10/2000 | Tucker | |
| 7,201,242 | B2 * | 4/2007 | Tucker, Jr. | B62D 55/065 180/9.1 |
| 7,464,997 | B2 * | 12/2008 | Longley | B62D 55/10 305/128 |
| 2001/0030068 | A1 * | 10/2001 | Nagorkca | B62D 55/08 180/6.2 |
| 2003/0019133 | A1 | 1/2003 | Hori | |
| 2006/0267405 | A1 * | 11/2006 | Tucker | B62D 55/065 305/115 |
| 2008/0136255 | A1 * | 6/2008 | Feldmann | B62D 55/244 305/167 |

OTHER PUBLICATIONS

Written Opinion of the International Searching Authority dated Feb. 4, 2014 in connection with International Patent Application PCT/CA2013/000869, 4 pages.

* cited by examiner

TRACK ASSEMBLY FOR AN OFF-ROAD VEHICLE

CROSS-REFERENCE TO RELATED APPLICATION

This application claims priority from U.S. Provisional Patent Application Ser. No. 61/713,169 filed on Oct. 12, 2012. The disclosure of the prior application is hereby incorporated in its entirety by reference.

FIELD OF THE INVENTION

The invention relates generally to off-road vehicles and, more particularly, to track assemblies for off-road vehicles.

BACKGROUND

Certain off-road vehicles, including industrial vehicles such as agricultural vehicles (e.g., harvesters, combines, tractors, etc.), construction vehicles (e.g., loaders, bulldozers, excavators, etc.) and forestry vehicles (e.g., fellerbunchers, tree chippers, knuckleboom loaders, etc.), as well as military vehicles (e.g., combat engineering vehicles (CEVs), etc.), to name a few, may be equipped with elastomeric endless tracks which enhance their traction and floatation on soft, slippery and/or irregular grounds (e.g., soil, mud, sand, ice, snow, etc.) on which they operate.

Typically, a track assembly of a tracked vehicle comprises a plurality of wheels and an endless track disposed around these wheels. The wheels include a drive wheel to impart motion to the endless track and a plurality of idler wheels to support part of the vehicle's weight on the ground via the track, guide the track as it is driven by the drive wheel, and/or tension the track.

Loading on a track assembly is often supported by a limited part (e.g., about 50% to 68%) of an inner side of its elastomeric endless track. For example, some idler wheels of the track assembly are roller wheels that roll on the track's inner side along a bottom run of the track to apply it on the ground. The roller wheels are located between frontmost and rearmost ones of the wheels of the track assembly and, in certain types of work vehicles such as agricultural or construction vehicles, are sometimes referred to as "mid-rollers". The track's inner side comprises rolling paths on which the roller wheels roll and a plurality of elastomeric guide/drive projections, referred to as "lugs", which are located between the rolling paths and used to guide and/or drive the track. Since the rolling paths are limited to those areas between the guide/drive lugs and lateral edges of the track, loading on the roller wheels is applied only to those limited areas of the track. In some cases, this may result in high wear of the track's rolling paths or even internal damage (e.g., cables rupturing) within the track. In other cases, this may impose certain limits on a load-carrying capacity of the tracked vehicle (e.g., a total weight of the vehicle) since it may cause unacceptably high ground pressure.

For these and other reasons, there is a need for improving track assemblies of off-road vehicles.

SUMMARY OF THE INVENTION

According to an aspect of the invention, there is provided a track assembly for traction of an off-road vehicle. The track assembly comprises a set of wheels and an endless track disposed around the set of wheels. The endless track comprises elastomeric material to flex around the set of wheels. The endless track comprises an inner side facing the set of wheels and comprising a plurality of drive/guide lugs projecting inwardly. The endless track comprises a ground-engaging outer side for engaging the ground and comprising a plurality of traction lugs projecting outwardly. The set of wheels comprises a drive wheel for imparting motion to the endless track. The set of wheels comprises a first plurality of roller wheels for rolling on a first rolling path of the inner side and a second plurality of roller wheels for rolling on a second rolling path of the inner side. The drive/guide lugs are located between the first rolling path and the second rolling path. The set of wheels comprises a third plurality of roller wheels for rolling on top of the drive/guide lugs.

According to another aspect of the invention, there is provided a track assembly for traction of an off-road vehicle. The track assembly comprises a set of wheels comprising a drive wheel, a first plurality of roller wheels, and a second plurality of roller wheels. The track assembly comprises an endless track disposed around the set of wheels. The endless track comprises elastomeric material to flex around the set of wheels. The endless track comprises an inner side facing the set of wheels and comprising a plurality of drive/guide lugs projecting inwardly. The endless track comprises a ground-engaging outer side for engaging the ground and comprising a plurality of traction lugs projecting outwardly. The drive wheel is rotatable for imparting motion to the endless track. Each of the first plurality of roller wheels is rotatable for rolling on a first rolling path of the inner side. Each of the second plurality of roller wheels is rotatable for rolling on a second rolling path of the inner side. The drive/guide lugs are located between the first rolling path and the second rolling path. The track assembly comprises a load distributor for contacting top surfaces of the drive/guide lugs to apply loading on the drive/guide lugs.

According to another aspect of the invention, there is provided a track assembly for traction of an off-road vehicle. The track assembly comprising a set of wheels and an endless track disposed around the set of wheels. The endless track comprises elastomeric material to flex around the set of wheels. The endless track comprises an inner side facing the set of wheels and comprising a plurality of drive/guide lugs projecting inwardly. The endless track comprises a ground-engaging outer side for engaging the ground and comprising a plurality of traction lugs projecting outwardly. The set of wheels comprises a drive wheel for imparting motion to the endless track and a set of roller wheels for rolling on the inner side of the endless track. A load-bearing widthwise extent of the inner side of the endless track bearing load from the set of roller wheels is at least 70% of a width of the endless track.

According to another aspect of the invention, there is provided a track assembly for traction of an off-road vehicle. The track assembly comprising a set of wheels and an endless track disposed around the set of wheels. The endless track comprises elastomeric material to flex around the set of wheels. The endless track comprises an inner side facing the set of wheels and comprising a plurality of drive/guide lugs projecting inwardly. The endless track comprises a ground-engaging outer side for engaging the ground and comprising a plurality of traction lugs projecting outwardly. The set of wheels comprises a drive wheel for imparting motion to the endless track and a set of roller wheels for rolling on the inner side of the endless track. A load-bearing area of the inner side of the endless track bearing load from the set of roller wheels is at least 70% of a theoretical load-bearable area of the inner side of the endless track.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 5 to 7A and 8 respectively show a perspective view of an inner side of an endless track of the track assembly, a plan view of a ground-engaging outer side of the endless track, a plan view of the inner side of the endless track, and a cross-sectional view of the endless track;

FIGS. 7B and 7C respectively show variants of guide/drive lugs of the endless track in accordance with other embodiments of the invention;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
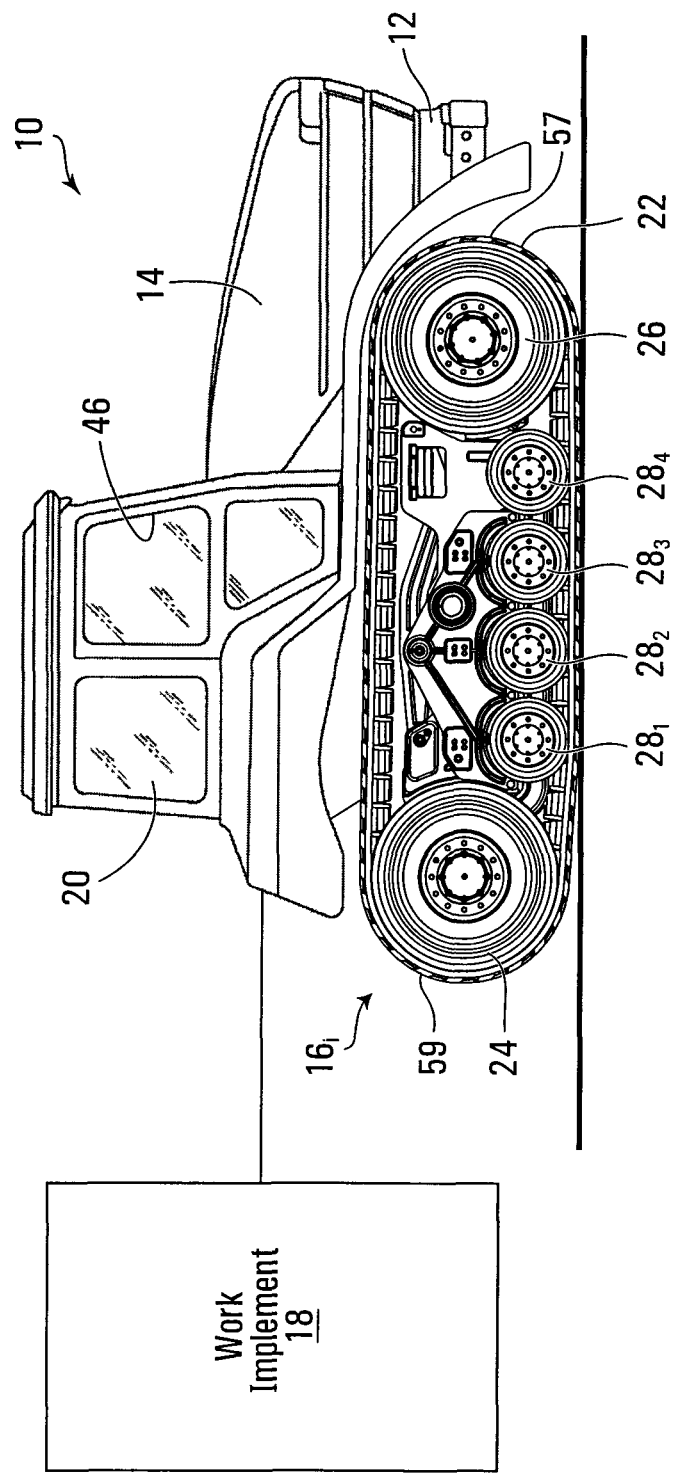
FIG. 1 shows an example of a tracked vehicle comprising track assemblies in accordance with an embodiment of the invention.

FIG. 1 shows an example of an off-road tracked vehicle 10 in accordance with an embodiment of the invention. In this embodiment, the vehicle 10 is a heavy-duty work vehicle for performing agricultural, construction or other industrial work or military work. More particularly, in this embodiment, the vehicle 10 is an agricultural vehicle for performing agricultural work. Specifically, in this example, the agricultural vehicle 10 is a tractor. In other examples, the agricultural vehicle 10 may be a combine harvester, another type of harvester, or any other type of agricultural vehicle.

The agricultural vehicle 10 comprises a frame 12 supporting a prime mover 14, a pair of track assemblies $16_1$, $16_2$ (which can be referred to as "undercarriages"), and an operator cabin 20, which enable an operator to move the agricultural vehicle 10 on the ground to perform agricultural work possibly using a work implement 18.

The prime mover 14 provides motive power to move the agricultural vehicle 10. For example, the prime mover 14 may comprise an internal combustion engine and/or one or more other types of motors (e.g., electric motors, etc.) for generating motive power to move the agricultural vehicle 10. The prime mover 14 is in a driving relationship with each of the track assemblies $16_1$, $16_2$. That is, power derived from the prime mover 14 is transmitted to the track assemblies $16_1$, $16_2$ via a powertrain of the agricultural vehicle 10.

The work implement 18 is used to perform agricultural work. For example, in some embodiments, the work implement 18 may be a combine head, a cutter, a scraper, a tiller, or any other type of agricultural work implement.

The operator cabin 20 is where the operator sits and controls the agricultural vehicle 10. More particularly, the operator cabin 20 comprises a user interface 46 including a set of controls that allow the operator to steer the agricultural vehicle 10 on the ground, operate the work implement 18, and control other aspects of the vehicle 10.

Figure 2:
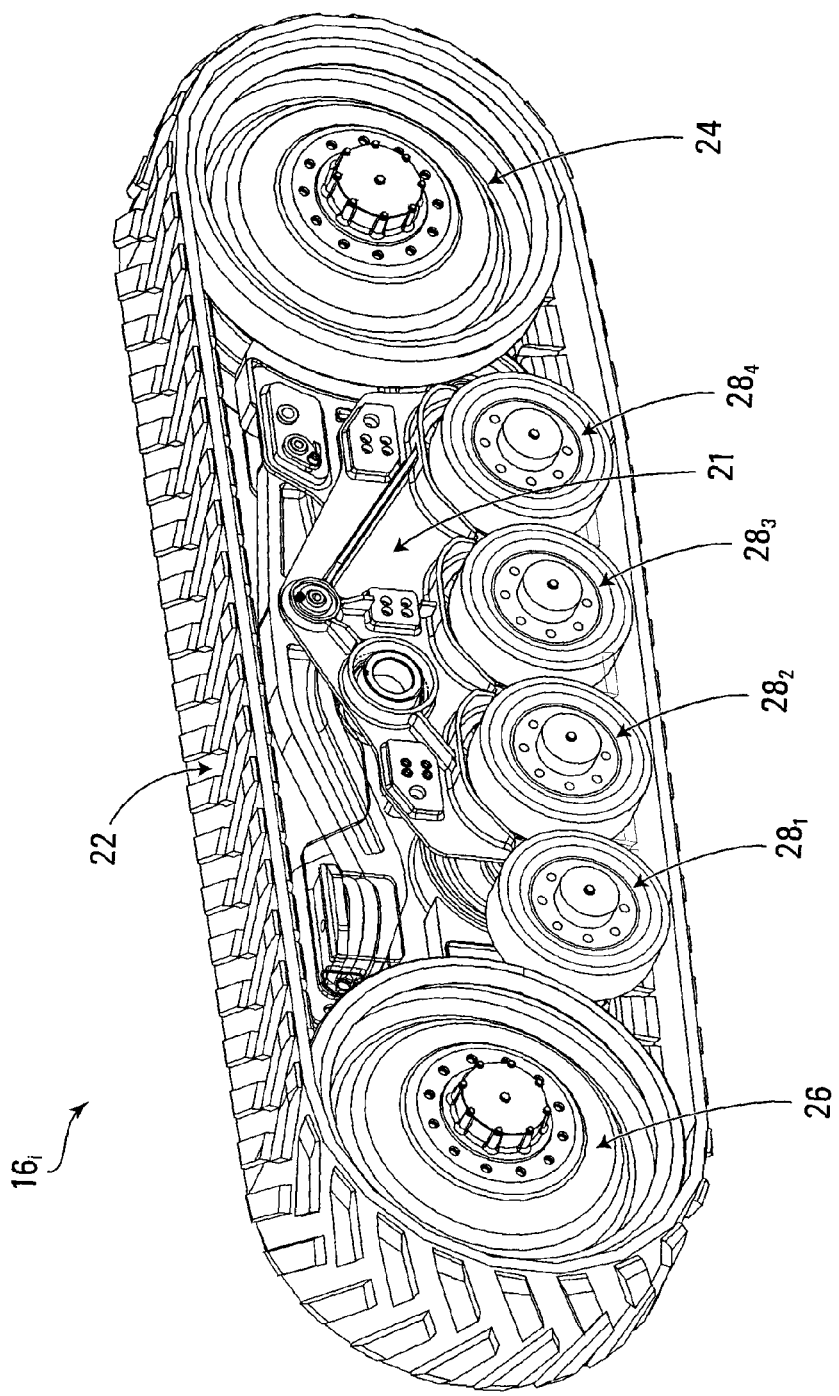
FIG. 2 shows a track assembly of the tracked vehicle.
Figure 3A:
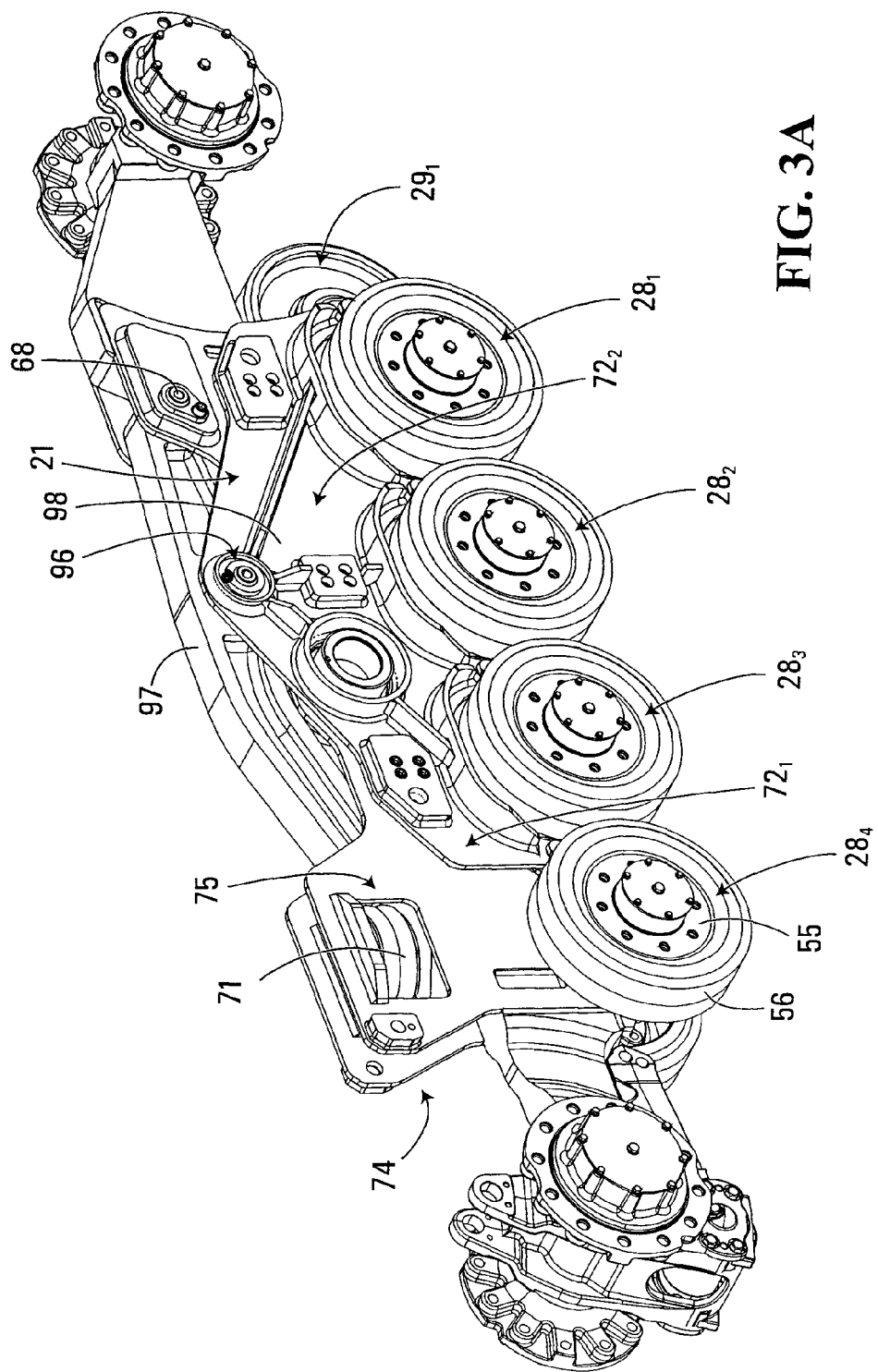
FIGS. 3A and 3B show part of the track assembly, including a frame and roller wheels (with some roller wheels in phantom or omitted)
Figure 3B:
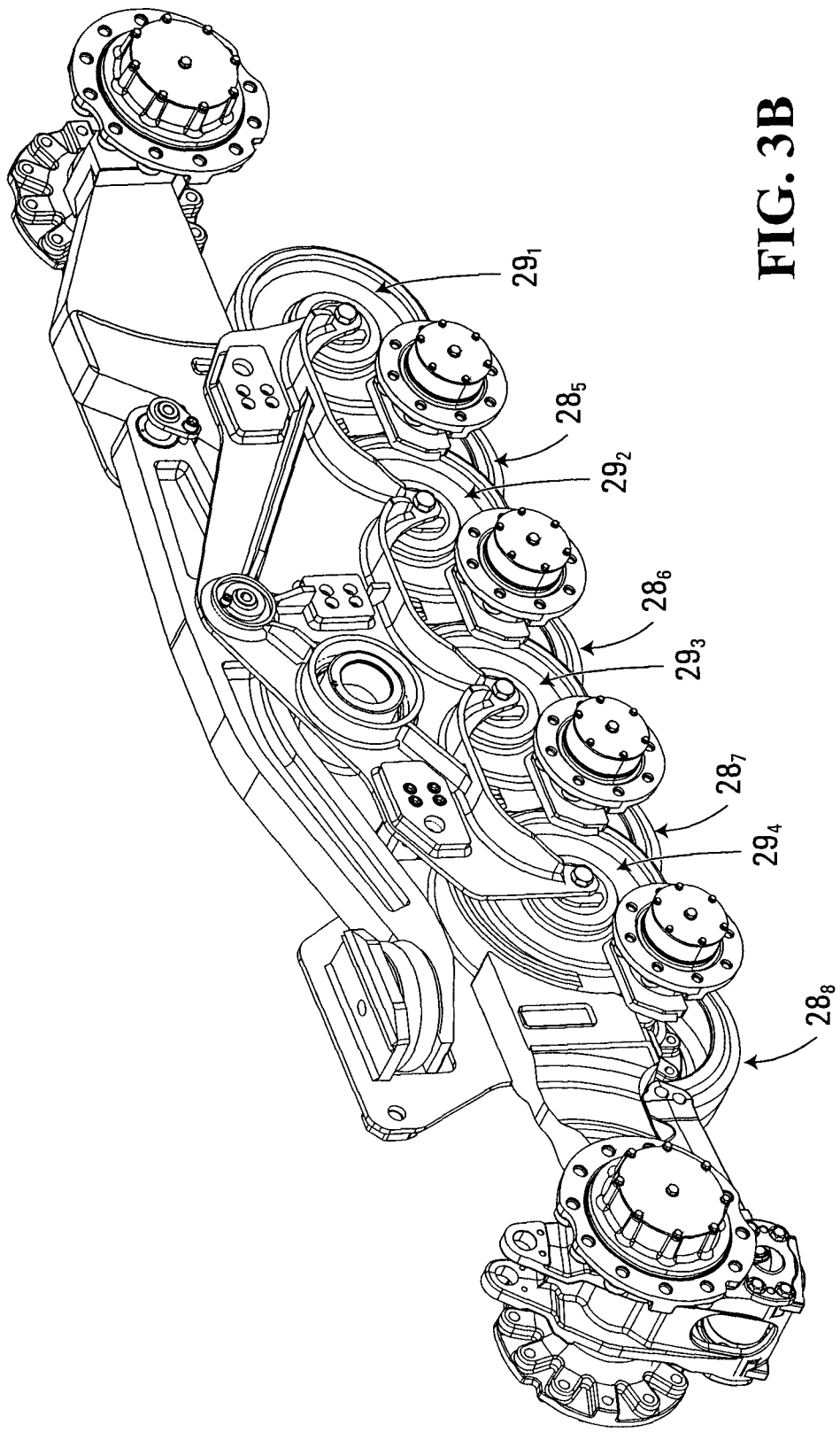
Figure 4:
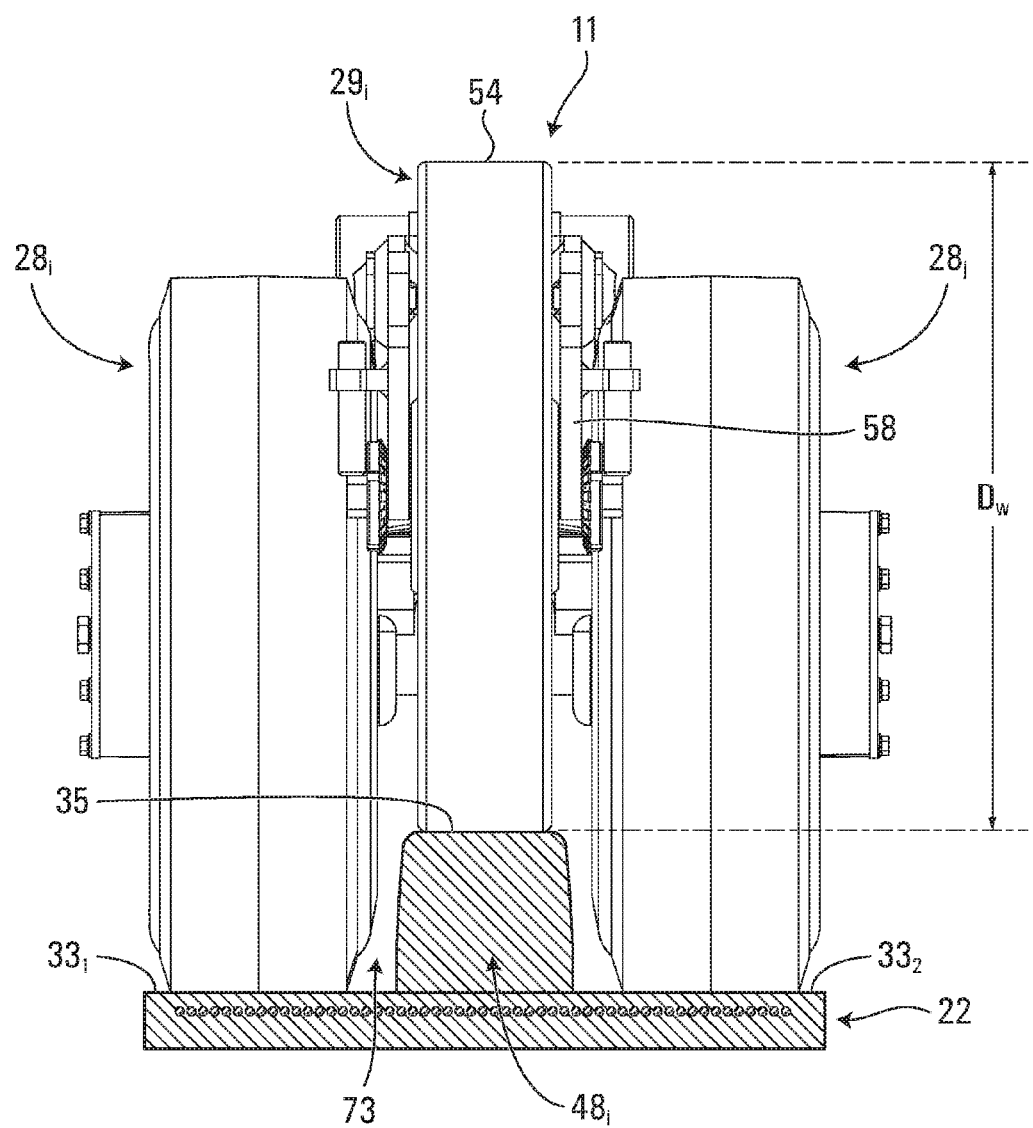
FIG. 4 shows a transversal view of the track assembly.
Figure 5:
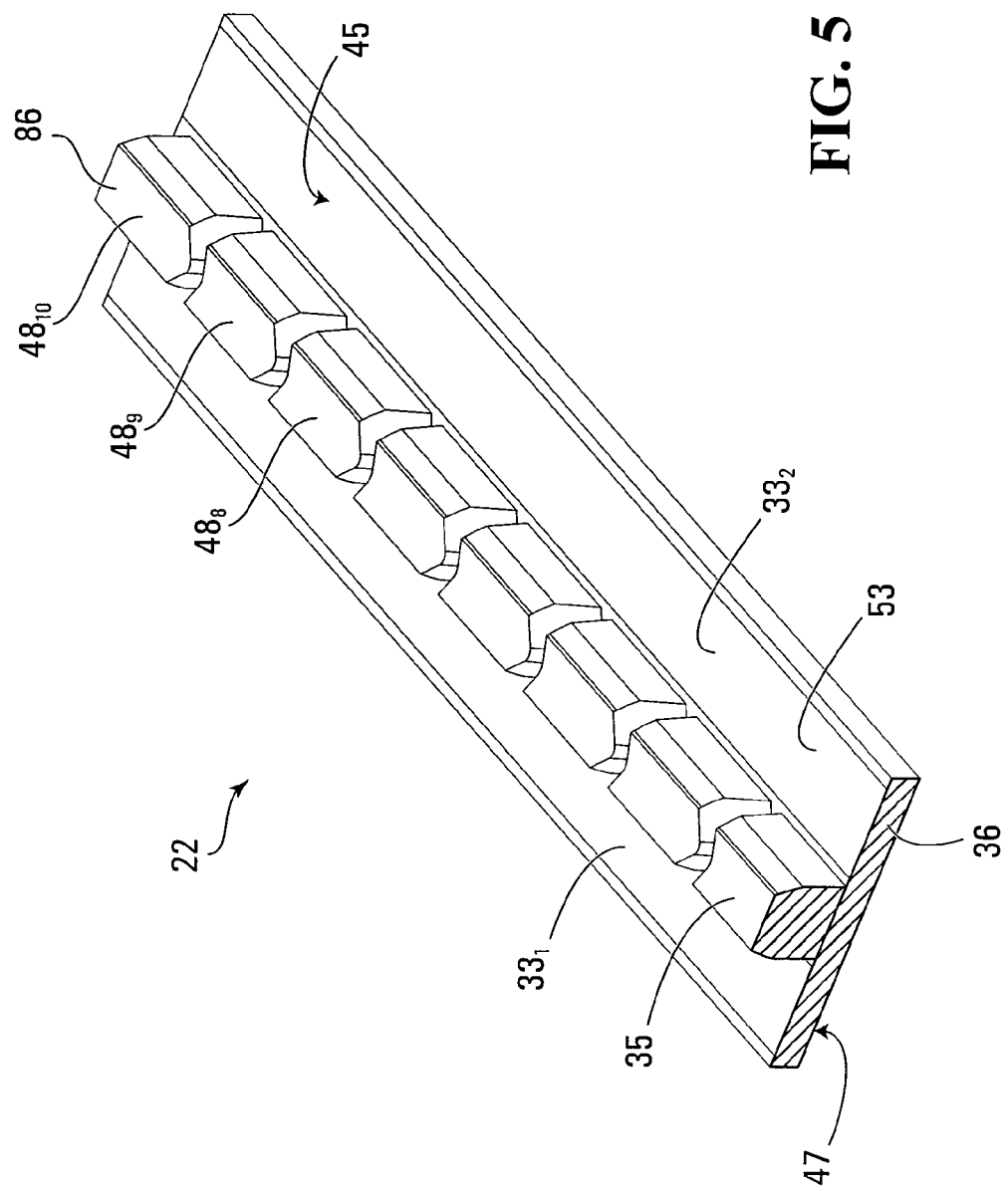
Figure 6:
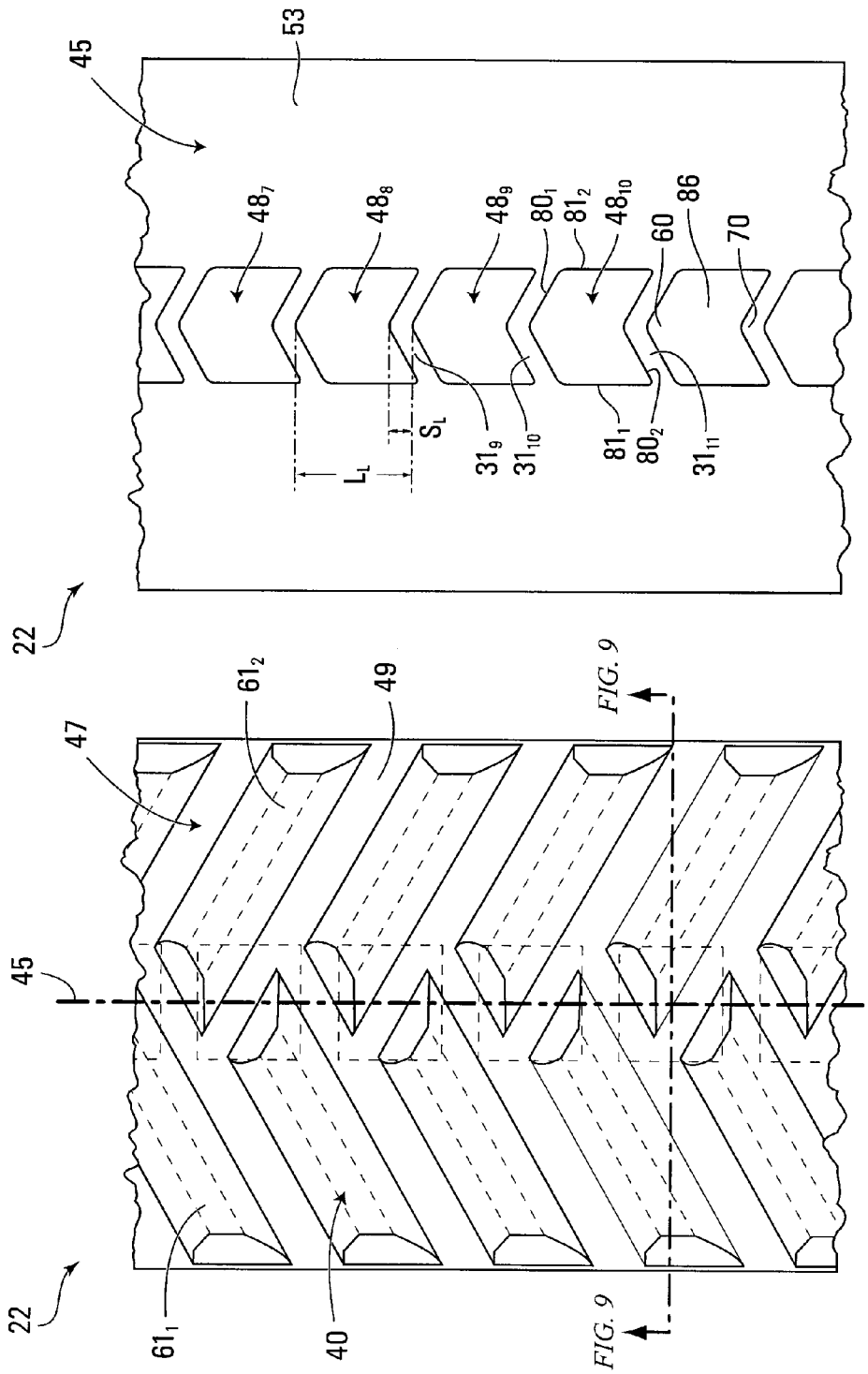
Figure 7:
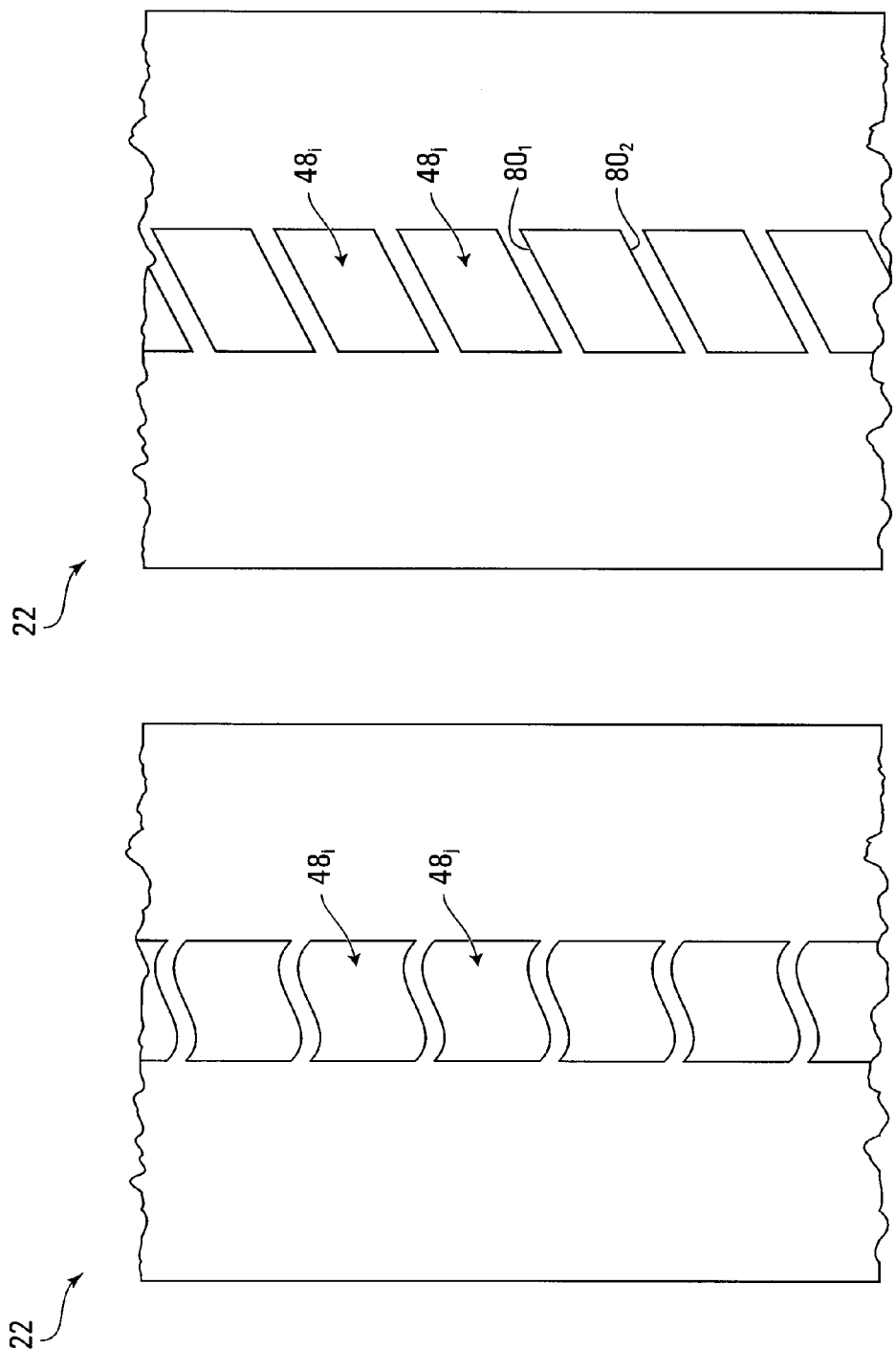
Figure 8:
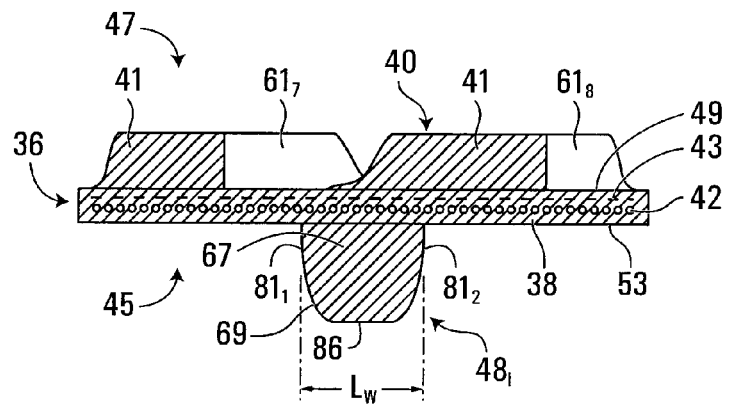

The track assemblies $16_1$, $16_2$ engage the ground to propel the agricultural vehicle 10. The track assembly $16_1$ is disposed on a right side of the vehicle 10, while the track assembly $16_2$ (not shown) is disposed on a left slide of the vehicle 10. With additional reference to FIGS. 2 to 4, in this embodiment, each track assembly $16_1$ comprises a frame 21, a set of wheels which includes a drive wheel 24 and a plurality of idler wheels that includes a front (leading) idler wheel 26 and a plurality of roller wheels $28_1$-$28_8$, $29_1$-$29_4$, and an elastomeric endless track 22 disposed around these wheels. The track assembly $16_i$ has a first longitudinal end 57 and a second longitudinal end 59 that define a length of the track assembly $16_i$. A width of the track assembly $16_i$ is defined by a width of the endless track 22. The track assembly $16_i$ has a longitudinal direction, a widthwise direction, and a height direction.

As further discussed later, in this embodiment, the track assembly $16_i$ is configured to effect a better load distribution on its endless track 22 by distributing loading over a greater area of the track 22. In some cases, this may help to reduce wear of and/or avoid internal damage within the endless track 22. This may also allow a greater load-carrying capacity for the vehicle 10 (e.g., a higher total weight of the vehicle 10) while maintaining an acceptable level of ground pressure. In this embodiment, the track assembly $16_i$ comprises a load distributor 11, which comprises the mid-rollers $29_1$-$29_4$, to provide enhanced load distribution.

The elastomeric endless track 22 engages the ground to provide traction to the agricultural vehicle 10. With additional reference to FIGS. 5 to 8, the track 22 has an inner side 45 facing the wheels 24, 26, $28_1$-$28_8$, $29_1$-$29_4$ and defining an inner area of the track 22 in which these wheels are located. The track 22 also has a ground-engaging outer side 47 opposite the inner side 45 and engaging the ground on which the agricultural vehicle 10 travels. The track 22 has a top run 65 which extends between the longitudinal ends 57, 59 of the track assembly $16_i$ and over the wheels 24, 26, $28_1$-$28_8$, $29_1$-$29_4$ and a bottom run 66 which extends between the longitudinal ends 57, 59 of the track assembly $16_i$ and under the wheels 24, 26, $28_1$-$28_8$, $29_1$-$29_4$. The track 22 has a longitudinal direction, a widthwise direction, and a thickness direction.

The elastomeric endless track 22 is elastomeric in that it comprises elastomeric material allowing it to flex, i.e., elastically change in shape, as it is in motion around the wheels 24, 26, $28_1$-$28_8$, $29_1$-$29_4$. More particularly, the track 22 comprises an elastomeric belt-shaped body 36 underlying its inner side 45 and its ground-engaging outer side 47. In view of its underlying nature, the body 36 can be referred to as a "carcass". The carcass 36 is elastomeric in that it comprises elastomeric material 38 which allows the track 22 to elastically change in shape as it is in motion around the wheels 24, 26, $28_1$-$28_8$, $29_1$-$29_4$. The elastomeric material 38 can include any polymeric material with suitable elasticity. In this embodiment, the elastomeric material includes rubber. Various rubber compounds may be used and, in some cases, different rubber compounds may be present in different areas of the track 22.

In other embodiments, the elastomeric material 38 may include another elastomer in addition to or instead of rubber (e.g., polyurethane elastomer).

In this embodiment, the carcass 36 comprises a plurality of reinforcements 42, 43 embedded in its elastomeric material 38. In this example, the reinforcement 42 is a layer of reinforcing cables that are adjacent to one another and that extend in the longitudinal direction of the track 22 to enhance strength in tension of the track 22 along its longitudinal direction. In some cases, a reinforcing cable may be a cord or wire rope including a plurality of strands or wires. In other cases, a reinforcing cable may be another type of cable and may be made of any material suitably flexible longitudinally (e.g., fibers or wires of metal, plastic or composite material). The reinforcement 43 is a layer of reinforcing fabric. Reinforcing fabric comprises pliable material made usually by weaving, felting, or knitting natural or synthetic fibers. For instance, a layer of reinforcing fabric may comprise a ply of reinforcing woven fibers (e.g., nylon fibers or other synthetic fibers). Various other types of reinforcements may be provided in the carcass 36 in other embodiments.

The inner side 45 of the endless track 22 comprises an inner surface 53 of the carcass 36 and a plurality of inner wheel-contacting projections $48_1$-$48_N$ that project from the inner surface 53 and are positioned to contact at least some of the wheels 24, 26, $28_1$-$28_8$, $29_1$-$29_4$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of guiding the track 22 and driving the track 22, the wheel-contacting lugs $48_1$-$48_N$ can be referred to as "guide/drive projections" or "guide/drive lugs". In some examples of implementation, a guide/drive lug $48_i$ may interact with the drive wheel 24 to drive the track 22, in which case the guide/drive lug $48_i$ is a drive lug. In other examples of implementation, a guide/drive lug $48_i$ may interact with the idler wheel 26 and/or the roller wheels $28_1$-$28_8$ to guide the track 22 to maintain proper track alignment and prevent de-tracking without being used to drive the track 22, in which case the guide/drive lug $48_i$ is a guide lug. In yet other examples of implementation, a guide/drive lug $48_i$ may both (i) interact with the drive wheel 24 to drive the track and (ii) interact with the idler wheel 26 and/or the roller wheels $28_1$-$28_8$ to guide the track 22 to maintain proper track alignment and prevent de-tracking, in which case the guide/drive lug $48_i$ is both a drive lug and a guide lug.

In this embodiment, the guide/drive lugs $48_1$-$48_N$ interact with the idler wheel 26 and the roller wheels $28_1$-$28_8$ in order to guide the track 22 as it is driven by the drive wheel 24, but do not interact with the drive wheel 24 to drive the track 22. The guide/drive lugs $48_1$-$48_N$ are thus guide lugs used only to guide the track 22 in this embodiment.

The guide/drive lugs $48_1$-$48_N$ are spaced apart along the longitudinal direction of the endless track 22. In this case, the guide/drive lugs $48_1$-$48_N$ are arranged in a single row. The guide/drive lugs $48_1$-$48_N$ may be arranged in other manners in other embodiments (e.g., in a plurality of rows that are spaced apart along the widthwise direction of the track 22).

The guide/drive lugs $48_1$-$48_N$ may have any suitable shape. Each guide/drive lug $48_i$ has a periphery 69 which, in this embodiment, includes a front surface $80_1$, a rear surface $80_2$, two side surfaces $81_1$, $81_2$, and a top surface 86. The front surface $80_1$ and the rear surface $80_2$ are opposed to one another along the longitudinal direction of the track 22. The two side faces $81_1$, $81_2$ are laterally opposed and may contact the roller wheels $28_1$-$28_8$, the drive wheel 24 and/or the idler wheel 26 such as to prevent excessive lateral movement of the track 22. In other embodiments where the guide/drive lug $48_i$ is used to drive the track 22, each of the front surface $80_1$ and the rear surface $80_2$ may constitute a drive surface which can be contacted by a drive member of the drive wheel 24 that pushes against it to impart motion to the track 22. Although it has a certain shape in this embodiment, the periphery 69 of the drive/guide lug $48_i$ may have various other shapes in other embodiments.

Each guide/drive lug $48_i$ has a front-to-rear dimension $L_L$ in the longitudinal direction of the endless track 22 and a side-to-side dimension $L_W$ in the widthwise direction of the endless track 22. In some cases, the front-to-rear dimension $L_L$ may be a width of the guide/drive lug $48_i$ while the side-to-side dimension $L_W$ may be a length of the guide/drive lug $48_i$. In other cases, the front-to-rear dimension $L_L$ may be a length of the guide/drive lug $48_i$ while the side-to-side dimension $L_W$ may be a width of the guide/drive lug $48_i$. In yet other cases, the front-to-rear dimension $L_L$ and the side-to-side dimension $L_W$ may be substantially the same. The guide/drive lug $48_i$ also has a height H.

Each guide/drive lug $48_i$ is an elastomeric guide/drive lug in that it is at least mainly (i.e., mainly or entirely) made of elastomeric material 67. That is, the elastomeric material 67 is either a sole constituent of the guide/drive lug $48_i$ or, if the guide/drive lug $48_i$ has more than one constituent, a main constituent of the guide/drive lug $48_i$. The elastomeric material 67 can include any polymeric material with suitable elasticity. More particularly, in this case, the elastomeric material 67 includes rubber. Various rubber compounds may be used and, in some cases, different rubber compounds may be present in different areas of each of the guide/drive lugs $48_1$-$48_N$. In other cases, the elastomeric material 67 may include another elastomer in addition to or instead of rubber. In some examples of implementation, the elastomeric material 67 may be a main constituent of the guide/drive lug $48_i$ which may also include one or more reinforcements embedded in the elastomeric material 67 (e.g., one or more layers of reinforcing fabric).

The ground-engaging outer side 47 comprises a ground-engaging outer surface 49 of the carcass 36 and a tread pattern 40 to enhance traction on the ground. The tread pattern 40 comprises a plurality of traction projections $61_1$-$61_M$ (sometimes referred to as "traction lugs", "tread members" or "tread bars") that project from the ground-engaging outer surface 49, are spaced apart along the longitudinal direction of the endless track 22, and engage the ground to enhance traction. In this embodiment, each of the traction projections $61_1$-$61_M$ has an elongated shape and is angled (i.e., defines an acute angle θ) relative to the longitudinal direction of the endless track 22. The traction projections $61_1$-$61_M$ may have various other shapes in other examples (e.g., curved shapes, shapes with straight parts and curved parts, etc.).

In this case, each of the traction projections $61_1$-$61_M$ is an elastomeric traction projection in that it is at least mainly made of elastomeric material 41. The elastomeric material 41 can include any polymeric material with suitable elasticity. More particularly, in this case, the elastomeric material 41 includes rubber. Various rubber compounds may be used and, in some cases, different rubber compounds may be present in different areas of each of the traction projections $61_1$-$61_M$. In other embodiments, the elastomeric material 41 may include another elastomer in addition to or instead of rubber.

The endless track 22 may be constructed in various other manners in other embodiments. For example, in some embodiments, the track 22 may comprise a plurality of elastomeric sections (e.g., rubber sections) interconnected to form the elastomeric belt-shaped body 36, the track 22 may have recesses or holes that interact with the drive wheel 24 in order to cause the track 22 to be driven, and/or the ground-engaging outer side 47 of the track 22 may comprise various patterns of traction projections.

The drive wheel 24 is rotatable about an axle for driving the track 22. Power generated by the prime mover 14 and delivered over the powertrain of the agricultural vehicle 10 can rotate the axle that rotates the drive wheel 24, which in turn imparts motion of the track 22.

In this embodiment, the drive wheel 24 is configured to frictionally engage the inner side 45 of the track 22 in order to frictionally drive the track 22 (i.e., the drive wheel 24 and the track 22 implement a "friction drive" system). In other embodiments, the drive wheel 24 may comprise a drive sprocket engaging the guide/drive lugs $48_1$-$48_N$ of the track 22 in order to drive the track 22 (i.e., the drive wheel 24 and the track 22 may implement a "positive drive" system). In other embodiments, the drive wheel 24 may be configured in various other ways. For example, in embodiments where the track 22 comprises recesses or holes, the drive wheel 24 may have teeth that enter these recesses or holes in order to drive the track 22.

The front idler wheel 26 and the roller wheels $28_1$-$28_8$, $29_1$-$29_4$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22.

More particularly, in this embodiment, the front idler wheel 26 maintains the track 22 in tension and may help to support part of the weight of the agricultural vehicle 10 on the ground via the track 22.

The roller wheels $28_1$-$28_8$, $29_1$-$29_4$ roll on the inner side 45 of the track 22 along the bottom run 66 of the track 22 to apply the bottom run 66 on the ground. In this case, as they are located between frontmost and rearmost ones of the wheels of the track assembly $16_i$, the roller wheels $28_1$-$28_8$, $29_1$-$29_4$ will be referred to as "mid-rollers". The mid-rollers $28_1$-$28_8$, $29_1$-$29_4$ are mounted to the frame 21 of the track assembly $16_i$.

In this embodiment, the inner side 45 of the track 22 comprises a plurality of rolling paths $33_1$, $33_2$ on which roll respective ones of the roller wheels $28_1$-$28_8$, namely the rolling path $33_1$ on which the mid-rollers $28_1$-$28_4$ roll and the rolling path $33_2$ on which the mid-rollers $28_5$-$28_8$ roll. The guide/drive lugs $48_1$-$48_N$ are located between the rolling paths $33_1$, $33_2$ in the track assembly's widthwise direction. In this way, the guide/drive lugs $48_1$-$48_N$ pass in a space 73 between the mid-rollers $28_1$-$28_4$ and the mid-rollers $28_5$-$28_8$ in order to guide the track 22.

The mid-rollers $29_1$-$29_4$ roll on the top surfaces 86 of respective ones of the guide/drive lugs $48_1$-$48_N$. This may allow a better load distribution on the endless track 22 since loading from the mid-rollers $28_1$-$28_8$, $29_1$-$29_4$ is distributed over a greater proportion of the track's width than if the mid-rollers $29_1$-$29_4$ were omitted but the track assembly $16_i$ was otherwise identical. In some cases, this may help to reduce wear of the rolling paths $33_1$, $33_2$ and/or avoid internal damage within the track 22 (e.g., avoid rupturing cables in the layer of cables 42). This may also help to maintain an acceptable ground pressure even if a load-carrying capacity of the vehicle 10 (e.g., a total weight of the vehicle 10) is increased beyond what would be permitted if the mid-rollers $29_1$-$29_4$ were omitted but the track assembly $16_i$ was otherwise identical.

More particularly, with the mid-rollers $29_1$-$29_4$ rolling on top of the guide/drive lugs $48_1$-$48_N$, the inner side 45 of the endless track 22 has a load-bearing area $A_{load}$ that is greater than if the mid-rollers $29_1$-$29_4$ were omitted but the track assembly $16_i$ was otherwise identical. The load-bearing area $A_{load}$ of the inner side 45 of the track 22 is that surface area of the inner side 45 of the track 22 which is in contact with the mid-rollers $28_1$-$28_8$, $29_1$-$29_4$ and bears vertical loading from the mid-rollers $28_1$-$28_8$, $29_1$-$29_4$ when the track assembly $16_i$ is on a horizontal flat ground surface. The load-bearing area $A_{load}$ of the inner side 45 of the track 22 can be measured as a sum of those areas of contact between the track 22 and the mid-rollers $28_1$-$28_8$, $29_1$-$29_4$ which bear vertical loading from the mid-rollers $28_1$-$28_8$, $29_1$-$29_4$ when the track assembly $16_i$ is on the horizontal flat ground surface. For example, in some embodiments, the load-bearing area $A_{load}$ of the inner side 45 of the track 22 may be at least 10% greater than if the mid-rollers $29_1$-$29_4$ were omitted but the track assembly $16_i$ was otherwise identical, in some cases at least 15% greater than if the mid-rollers $29_1$-$29_4$ were omitted but the track assembly $16_i$ was otherwise identical, in some cases at least 20% greater than if the mid-rollers $29_1$-$29_4$ were omitted but the track assembly $16_i$ was otherwise identical, and in some cases even more (e.g., at least 30% greater than if the mid-rollers $29_1$-$29_4$ were omitted but the track assembly $16_i$ was otherwise identical). The load-bearing area $A_{load}$ of the inner side 45 of the track 22 may have any other value in other embodiments.

The load-bearing area $A_{load}$ of the inner side 45 of the track 22 may thus be significant in relation to a theoretical load-bearable area $A^*_{load}$ of the inner side 45 of the track 22. The theoretical load-bearable area $A^*_{load}$ of the side 45 of the load of the inner track 22 is that theoretical surface area of the inner side 45 of the track 22 which would be capable of bearing vertical loading from mid-rollers such as the mid-rollers $28_1$-$28_8$, $29_1$-$29_4$ when the track assembly $16_i$ would be on a horizontal flat ground surface if the inner side 45 of the track 22 was flat (i.e., the track 22 had no guide/drive lugs). The theoretical load-bearable area $A^*_{load}$ of the inner side 45 of the track 22 can be measured by multiplying a length and a width of that portion of the bottom run 66 of the track 22 in contact with the horizontal flat ground surface. For instance, in some embodiments, the load-bearing area $A_{load}$ of the inner side 45 of the track 22 may be at least 70%, in some cases at least 75%, in some cases at least 80%, in some cases at least 85%, in some cases 90%, and in some cases even more (e.g., at least 95%) of the theoretical load-bearable area $A^*_{load}$ of the inner side 45 of the track 22.

Considering a transversal cross-section of the endless track 22, the inner side 45 of the endless track 22 has a load-bearing widthwise extent $W_{load}$ that is greater than if the mid-rollers $29_1$-$29_4$ were omitted but the track assembly $16_i$ was otherwise identical. The load-bearing widthwise extent $W_{load}$ load of the inner side 45 of the track 22 is that widthwise extent of the inner side 45 of the track 22 which is in contact with the mid-rollers $28_1$-$28_8$, $29_1$-$29_4$ and bears vertical loading from the mid-rollers $28_1$-$28_8$, $29_1$-$29_4$ when the track assembly $16_i$ is on a horizontal flat ground surface. The load-bearing widthwise extent $W_{load}$ of the inner side 45 of the track 22 can be measured as a sum of those widthwise lines of contact between the track 22 and the mid-rollers $28_1$-$28_8$, $29_1$-$29_4$ which bear vertical loading from the mid-rollers $28_1$-$28_8$, $29_1$-$29_4$ when the track assembly $16_i$ is on the horizontal flat ground surface. For example, in some embodiments, the load-bearing widthwise extent $W_{load}$ of the inner side 45 of the track 22 may be at least 10% greater than if the mid-rollers $29_1$-$29_4$ were omitted but the track assembly $16_i$ was otherwise identical, in some cases at least 15% greater than if the mid-rollers $29_1$-$29_4$ were omitted but the track assembly $16_i$ was otherwise identical, in some cases at least 20% greater than if the mid-rollers $29_1$-$29_4$ were omitted but the track assembly $16_i$ was otherwise identical, and in some cases even more (e.g., at least 30% greater than if the mid-rollers $29_1$-$29_4$ were omitted but the track assembly $16_i$ was otherwise identical). The load-bearing widthwise extent $W_{load}$ of the inner side 45 of the track 22 may have any other value in other embodiments.

The load-bearing widthwise extent $W_{load}$ of the inner side 45 of the track 22 may thus be significant in relation to the width of the track 22. For instance, in some embodiments, the load-bearing widthwise extent $W_{load}$ of the inner side 45 of the track 22 may be at least 70%, in some cases at least 75%, in some cases at least 80%, in some cases at least 85%, in some cases at least 90%, and in some cases even more (e.g., at least 95%) of the width of the track 22.

The width of the endless track 22 can have any suitable value. For example, in some embodiments, the track 22 may be a "narrow" track such that its width is less than 24 inches. This may be useful, for instance, in embodiments in which the agricultural vehicle 10 is used on a relatively firm soil and/or for an application with spatial constraints (e.g., row cropping in narrow row spacings, strip-till, controlled traffic farming, etc.). For instance, in some examples of implementation, the width of the track 22 may be about 16 inches. The load-bearing area $A_{load}$ of the inner side 45 of the track 22 increased by the mid-rollers $29_1$-$29_4$ can be useful in embodiments in which the track 22 is a narrow track since the rolling paths $33_1$, $33_2$ for the mid-rollers $28_1$-$28_8$ are limited in their widthwise extent and thus impose limits on loading applicable by the mid-rollers $28_1$-$28_8$. As another example, in some embodiments, the track 22 may be a "wide" track such that its width is at least 24 inches. This may be useful, for instance, in embodiments in which the agricultural vehicle 10 is used on a relatively soft or wet soil since the track 22 can provide increase floatation and/or for an application without spatial constraints.

A peak ground pressure $P_{peak}$ of the endless track 22 on the ground may be lower than if the mid-rollers $29_1$-$29_4$ were omitted but the track assembly $16_i$ was otherwise identical. The peak ground pressure $P_{peak}$ of the track 22 on the ground is a highest pressure applied by the track 22 onto a horizontal flat ground surface when the track assembly $16_i$ is on the horizontal flat ground surface. For example, in some embodiments, the peak ground pressure $P_{peak}$ of the track 22 on the ground may be at least 10% lower than if the mid-rollers $29_1$-$29_4$ were omitted but the track assembly $16_i$ was otherwise identical, in some cases at least 15% lower than if the mid-rollers $29_1$-$29_4$ were omitted but the track assembly $16_i$ was otherwise identical, in some cases at least 20% lower than if the mid-rollers $29_1$-$29_4$ were omitted but the track assembly $16_i$ was otherwise identical, and in some cases even less, and in some cases even less (e.g., at least 20% lower than if the mid-rollers $29_1$-$29_4$ were omitted but the track assembly $16_i$ was otherwise identical). The peak ground pressure $P_{peak}$ of the track 22 on the ground may have any other value in other embodiments.

A load-bearing capacity $C_{track}$ of the track assembly $16_i$ (i.e., a load born by the track assembly $16_i$) may be increased in light of the lower peak ground pressure $P_{peak}$ of the endless track 22 on the ground (e.g., while still meeting requirements for homologation). For example, in some embodiments, a ratio $C_{track}/P_{peak}$ of the load-bearing capacity $C_{track}$ of the track assembly $16_i$ over the peak ground pressure $P_{peak}$ of the endless track 22 on the ground may be at least 13 kN/bar (where 1 bar=14.5 psi), in some cases at least 14 kN/bar, in some cases at least 15 kN/bar, and in some cases even more (e.g., at least 16 kN/bar). The ratio $C_{track}/P_{peak}$ may have any other value in other embodiments.

The top surfaces 86 of the guide/drive lugs $48_1$-$48_N$ form a rolling path 35 on which the mid-rollers $29_1$-$29_4$ can move. The rolling path 35 extends in the longitudinal direction of the track 22 such that, as the tracked vehicle 10 moves, the mid-rollers $29_1$-$29_4$ roll from the top surface 86 of one of the guide/drive lugs $48_1$-$48_N$ to the top surface 86 of another one of the guide/drive lugs $48_1$-$48_N$.

In this example of implementation, the top surfaces 86 of the guide/drive lugs $48_1$-$48_N$ may be relatively long in the longitudinal direction of the endless track 22 to provide increased surface area for a longitudinal extent of the rolling path 35. For example, in this embodiment, the front-to-rear dimension $L_L$ of each guide/drive lug $48_i$ may be greater than the side-to-side dimension $L_W$ of the guide/drive lug $48_i$. For instance, in some embodiments, a ratio $L_L/L_W$ of the front-to-rear dimension $L_L$ of the guide/drive lug $48_i$ over the side-to-side dimension $L_W$ of the guide/drive lug $48_i$ may be at least 1.25, in some cases at least 1.5, in some cases at least 1.75, and in some cases even more (e.g., 2 or more). The ratio $L_L/L_W$ may have any other value in other embodiments.

In this embodiment, the guide/drive lugs $48_1$-$48_N$ are shaped such that the rolling path 35 is continuous over successive ones of the guide/drive lugs $48_1$-$48_N$ for the mid-rollers $29_1$-$29_4$. The rolling path 35 is "continuous" in that it prevents each mid-roller $29_i$ from falling excessively or getting stuck in between consecutive ones of the guide/drive lugs $48_1$-$48_N$ as it rolls on the top surfaces 86 of the guide/drive lugs $48_1$-$48_N$. For instance, the guide/drive lugs $48_1$-$48_N$ may be shaped such that a mid-roller $29_i$ rolling on the top surface 86 of a given one of the guide/drive lugs $48_1$-$48_N$ comes into contact with the top surface 86 of a succeeding one of the guide/drive lugs $48_1$-$48_N$ before leaving the top surface 86 of the given one of the guide/drive lugs $48_1$-$48_N$.

More particularly, in this embodiment, there are gaps $31_1$-$31_M$ between successive ones of the guide/drive lugs $48_1$-$48_N$ which facilitate bending of the track 22 as it turns around the drive wheel 24 and the front idler wheel 26 and the guide/drive lugs $48_1$-$48_N$ are configured to minimize these gaps $31_1$-$31_M$ to make the rolling path 35 continuous for the mid-rollers $29_1$-$29_4$.

For example, in this embodiment, a longitudinal distance $S_L$ between consecutive ones of the guide/drive lugs $48_1$-$48_N$ may be sufficiently small relative to a diameter $D_W$ of each mid-roller $29_i$ to prevent the mid-roller $29_i$ from falling excessively or getting stuck between these lugs. For instance, in some embodiments, a ratio $S_L/D_W$ of the longitudinal distance $S_L$ between consecutive ones of the guide/drive lugs $48_1$-$48_N$ and the diameter $D_W$ of the mid-roller $29_i$ may be no more than 0.15, in some cases no more than 0.10, in some cases no more than 0.08, and in some cases even less.

Also, in this embodiment, the guide/drive lugs $48_1$-$48_N$ are shaped such that they mesh with one another to make the rolling path 35 continuous. To that end, each of the guide/drive lugs $48_1$-$48_N$ comprises a meshing portion 60 and a meshing space 70 such that the meshing portion 60 of a given guide/drive lug $48_i$ extends in the longitudinal direction of the track 22 towards the meshing space 70 of a successive guide/drive lug $48_j$. The meshing portion 60 of each guide/drive lug $48_i$ includes a convexity while the meshing space 70 of the drive/guide lug $48_i$ includes a concavity. More particularly, in this example, the meshing portion 60 of each of the guide/drive lugs $48_1$-$48_N$ forms a projection at one end of that guide/drive lug and the meshing space 70 of that guide/drive lug forms a recess at an opposite end of that guide/drive lug. In this case, each of the projection 60 and the recess 70 is generally V-shaped. The projection 60 and the recess 70 may have any other suitable shape in other cases. When the mid-rollers $29_1$-$29_4$ pass on a given guide/drive lug $48_i$ and a succeeding guide/drive lug $48_j$, the projection 60 of the guide/drive lug $48_i$ extends into the recess 70 of the guide/drive lug $48_j$ such that the top surfaces 86 of the guide/drive lug $48_i$ and the guide/drive lug $48_j$ at least reach, and in this case overlap, one another in the longitudinal direction of the track 22. The meshing portion 60 and the meshing space 70 of each of the guide/drive lugs $48_1$-$48_N$ may be shaped in various other ways in other embodiments. For example, FIG. 7B shows an embodiment in which each of the guide/drive lugs $48_1$-$48_N$ has an S-like shape that meshes with an adjacent one of the guide/drive lugs $48_1$-$48_N$.

In other embodiments, the guide/drive lugs $48_1$-$48_N$ may not mesh with one another but may still make the rolling path 35 continuous. For example, in some embodiments, as shown in FIG. 7C, the front surface $80_1$ and the rear surface $80_2$ of each of the guide/drive lugs $48_1$-$48_N$ may extend transversally to the longitudinal direction of the track 22 so that they are slanted towards an adjacent one of the guide/drive lugs $48_1$-$48_N$.

While in this embodiment the gap $31_i$ between a given guide/drive lug $48_i$ and a succeeding guide/drive lug $48_j$ exists when the mid-rollers $29_1$-$29_4$ pass on the guide/drive lug $48_i$ and the guide/drive lug $48_j$, in other embodiments, the guide/drive lugs $48_i$, $48_j$ may be configured such that, when the mid-rollers $29_1$-$29_4$ pass on them, the gap $31_i$ is completely closed and no longer exists, i.e., the guide/drive lugs $48_i$, $48_j$ are contiguous to one another. In such embodiments, the guide/drive lugs $48_1$-$48_N$ can still bend as they pass around the drive wheel 24 and the idler wheel 26. For instance, in some cases, the guide/drive lugs $48_1$-$48_N$ may be "compressible" (e.g., hollow and/or at least partially made of soft material) such that they can bend easily around the drive wheel 24 and the idler wheel 26.

Each mid-roller $29_i$ comprises a hub portion 55, a rim portion 56, and a radially-extending portion between the hub portion 55 and the rim portion 56. The hub portion 55 is an inner portion of the mid-roller $29_i$ which is associated with a hub receiving an axle 58 defining an axis of rotation of the mid-roller $29_i$. The rim portion 56 is an outer portion of the mid-roller $29_i$ which contacts the guide/drive lugs $48_1$-$48_N$ and comprises a rolling surface 54 that rolls on the top surfaces 86 of the guide/drive lugs $48_1$-$48_N$.

The mid-roller $29_i$ may comprise any suitable material. In this embodiment, the mid-roller $29_i$ comprises metallic material (e.g., steel). In this example, the mid-roller $29_i$ is entirely made of metallic material.

Different parts of the mid-roller $29_i$ may be made of different materials in other embodiments. For instance, in some embodiments, the rolling surface 54 of the mid-roller $29_i$ may comprise nonmetallic material. For example, in some embodiments, a core of the mid-roller $29_i$ may be made of metallic material while the rolling surface 54 may include polymeric material (e.g., elastomeric material) to enhance its interaction with the top surfaces 86 of the guide/drive lugs $48_1$-$48_N$. For instance, in some examples of implementation, the polymeric material may be rubber (e.g., to enhance friction) or polyurethane (e.g., to minimize mud buildup). The polymeric material and the metallic material may be held together in any suitable manner (e.g., by a polymer-metal adhesive, by overmolding, etc.).

An interface between the mid-roller $29_i$ and a guide/drive lug $48_i$ may have any suitable form. In this embodiment, the top surface 86 of the guide/drive lug $48_i$ is substantially flat and the rolling surface 54 of the mid-roller $29_i$ is substantially flat in a direction parallel to the axis of rotation of the mid-roller $29_i$ such that the interface between the mid-roller $29_i$ and the guide/drive lug $48_i$ is substantially flat. This may help to maximize a widthwise load distribution on the guide/drive lug $48_i$.

In this embodiment, the track assembly $16_i$ comprises a suspension 74 for absorbing shocks, reducing vibrations, and/or improving ride quality and for controlling load distribution among the mid-rollers $28_1$-$28_8$ rolling on the rolling paths $33_1$, $33_2$ of the inner surface 53 of the carcass 36 of the track 22 and the mid-rollers $29_1$-$29_4$ rolling on the top surfaces 86 of the guide/drive lugs $48_1$-$48_N$.

More particularly, in this embodiment, the suspension 74 is configured such that each of the mid-rollers $29_1$-$29_4$ rolling on the top surfaces 86 of the guide/drive lugs $48_1$-$48_N$ is movable relative to at least one of the mid-rollers $28_1$-$28_8$ rolling on the rolling paths $33_1$, $33_2$ of the inner surface 53 of the carcass 36 of the track 22 in the height direction of the track assembly $16_i$. In this case, each of the mid-rollers $29_1$-$29_4$ is movable relative to all of the mid-rollers $28_1$-$28_8$ in the height direction of the track assembly $16_i$.

In this example of implementation, the mid-rollers $28_1$-$28_8$ are mounted to a frame structure $72_1$ of the frame 21 and the mid-rollers $29_1$-$29_4$ are mounted to a frame structure $72_2$ of the frame 21. The frame structures $72_1$, $72_2$ are movable relative one another. More particularly, in this case, the frame structures $72_1$, $72_2$ are pivotable relative to one another about a pivot 68. Relative movement of the frame structures $72_1$, $72_2$ causes the mid-rollers $29_1$-$29_4$ to move relative to the mid-rollers $28_1$-$28_8$. When the frame structure $72_2$ pivots relative to the frame structure $72_1$ about the pivot 68 in a clockwise direction, the mid-rollers $29_1$-$29_4$ are move upwardly relative to the mid-rollers $28_1$-$28_8$. Conversely, when the frame structure $72_2$ pivots relative to the frame structure $72_1$ about the pivot 68 in a counterclockwise direction, the mid-rollers $29_1$-$29_4$ are move downwardly relative to the mid-rollers $28_1$-$28_8$.

More particularly, in this example, the frame structure $72_2$ comprises a support arm 97 and a roller carrier 98 which depends from the support arm 97 and carries the mid-rollers $29_1$-$29_4$. The support arm 97 is pivotally coupled to the frame structure $72_1$, which carries the mid-rollers $28_1$-$28_8$, at the pivot 68. The roller carrier 98 is pivotally coupled to the support arm 97 at a pivot 96 such that it can pivot relative to the support arm 97. The axle 58 of each of the mid-rollers $29_1$-$29_4$ is rotatably mounted to the roller carrier 98.

The suspension 74 comprises a resilient device 75 mounted between the mid-rollers $28_1$-$28_8$, $29_1$-$29_4$ and the frame 21. In this case, the resilient device 75 is mounted between the frame structures $72_1$, $72_2$. The resilient device 75 is configured to change from a first configuration to a second configuration in response to a load and recover the first configuration in response to removal of the load to allow movement of the frame structures $72_1$, $72_2$ relative to one another in the height direction of the track assembly $16_i$.

The resilient device 75 comprises a spring 71. More particularly, in this embodiment, the spring 71 is a fluid spring (i.e., a spring including a liquid or gas contained in a container such as a cylinder or a bellows and variably compressed by a piston or other structure), in this case a gas spring (e.g., an air spring). The spring 71 may be any other suitable type of spring in other embodiments. For example, in some embodiments, the spring 71 may be a coil spring (e.g., a metallic or polymeric coil spring), an elastomeric spring (e.g., a rubber spring), a leaf spring, or any other elastic object that changes in configuration under load and recovers its initial configuration when the load is removed.

The spring 71 can help to absorb shocks, for example, when the track assembly $16_i$ travels over rough terrain or engages an obstacle on the ground. The spring 71 may also reduce vibrations as the mid-rollers $29_1$-$29_4$ roll on the top surfaces 86 of the guide/drive lugs $48_1$-$48_N$ and across the gaps $31_1$-$31_M$ between successive ones of the guide/drive lugs $48_1$-$48_N$.

When the spring 71 contracts, the frame structure $72_2$ pivots relative to the frame structure $72_1$ about the pivot 68 in a clockwise direction, thereby causing the mid-rollers $29_1$-$29_4$ to move upwardly relative to the mid-rollers $28_1$-$28_8$. Conversely, when the spring 71 expands, the frame structure $72_2$ pivots relative to the frame structure $72_1$ about the pivot 68 in a counterclockwise direction, thereby causing the mid-rollers $29_1$-$29_4$ to move downwardly relative to the mid-rollers $28_1$-$28_8$.

In this embodiment, the suspension 74 is controllable to adjust how loading is distributed among the mid-rollers $28_1$-$28_8$ rolling on the rolling paths $33_1$, $33_2$ of the inner surface 53 of the carcass 36 of the track 22 and the mid-rollers $29_1$-$29_4$ rolling on the top surfaces 86 of the guide/drive lugs $48_1$-$48_N$. The suspension 74 may thus be controlled to adjust a ratio of load born by the mid-rollers $28_1$-$28_8$ rolling on the rolling paths $33_1$, $33_2$ of the inner surface 53 of the carcass 36 and load born by the mid-rollers $29_1$-$29_4$ rolling on the top surfaces 86 of the guide/drive lugs $48_1$-$48_N$.

For example, in some cases, the suspension 74 may be controlled to distribute loading evenly among the mid-rollers $28_1$-$28_8$ and the mid-rollers $29_1$-$29_4$. In such cases, the load born by the mid-rollers $28_1$-$28_8$ rolling on the rolling paths $33_1$, $33_2$ of the inner surface 53 of the carcass 36 and the load born by the mid-rollers $29_1$-$29_4$ rolling on the top surfaces 86 of the guide/drive lugs $48_1$-$48_N$ would be substantially identical.

As another example, in some cases, the suspension 74 may be controlled to distribute loading evenly among the rolling paths $33_1$, $33_2$ of the inner surface 53 of the carcass 36 of the track 22 and the rolling path 35 formed by the top surfaces 86 of the guide/drive lugs $48_1$-$48_N$. Thus, in such cases, one-third of the loading would be applied on each of the rolling paths $33_1$, $33_2$ of the inner surface 53 of the carcass 36 of the track 22 and the rolling path 35 formed by the top surfaces 86 of the guide/drive lugs $48_1$-$48_N$.

As yet another example, in some cases, the suspension 74 may be controlled to distribute loading such that more load is applied on a given one the rolling paths $33_1$, $33_2$ of the inner surface 53 of the carcass 36 of the track 22 and the rolling path 35 formed by the top surfaces 86 of the guide/drive lugs $48_1$-$48_N$ than on another one of these rolling paths $33_1$, $33_2$, 35. For instance, in some embodiments, when the vehicle 10 is travelling on a road or turning, the suspension 74 may distribute loading such that more load is applied on the rolling path 35 formed by the top surfaces 86 of the guide/drive lugs $48_1$-$48_N$, which is in a central region of the track 22, than on each of the rolling paths $33_1$, $33_2$ of the inner surface 53 of the carcass 36 of the track 22. This may help to reduce an area of friction between the track 22 and the ground in those situations and may facilitate steering of the vehicle 10.

Figure 9A:
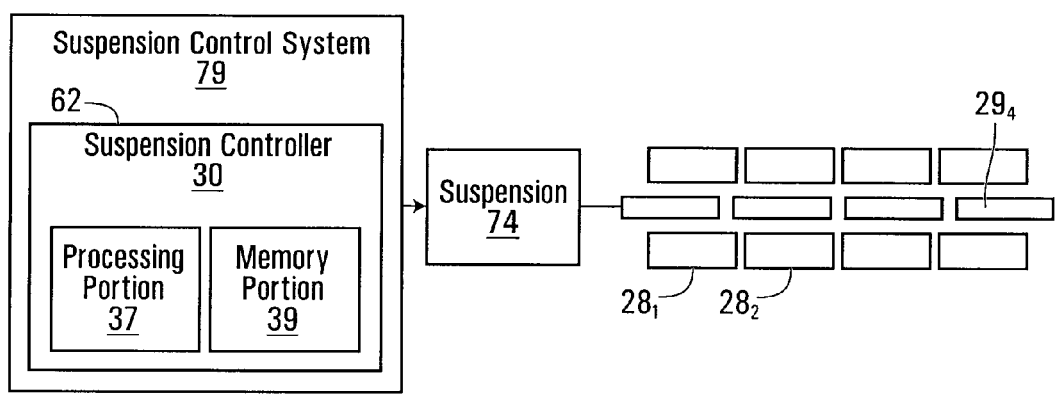
FIGS. 9A and 9B show a suspension and a suspension control system of the tracked vehicle.

As shown in FIG. 9A, in this embodiment, the agricultural vehicle 10 comprises a suspension control system 79 for controlling operation of the suspension 74. The suspension control system 79 comprises a suspension controller 30 for controlling other of its components.

More particularly, in this embodiment, the resilient device 75 has a stiffness which is variable and the suspension control system 79 is operative to control the stiffness of the resilient device 75. In this example, the suspension control system 79 controls the stiffness of the spring 71. To that end, in this example in which the spring 71 is a gas spring, the suspension control system 79 is configured to cause a variation of pressure of a gas within the gas spring 71 which induces a variation of the stiffness of the gas spring 71. Increasing the pressure of the gas within the gas spring 71 increases the stiffness of the gas spring 71, while decreasing the pressure of the gas within the gas spring 71 decreases the stiffness of the gas spring 71.

Figure 9B:
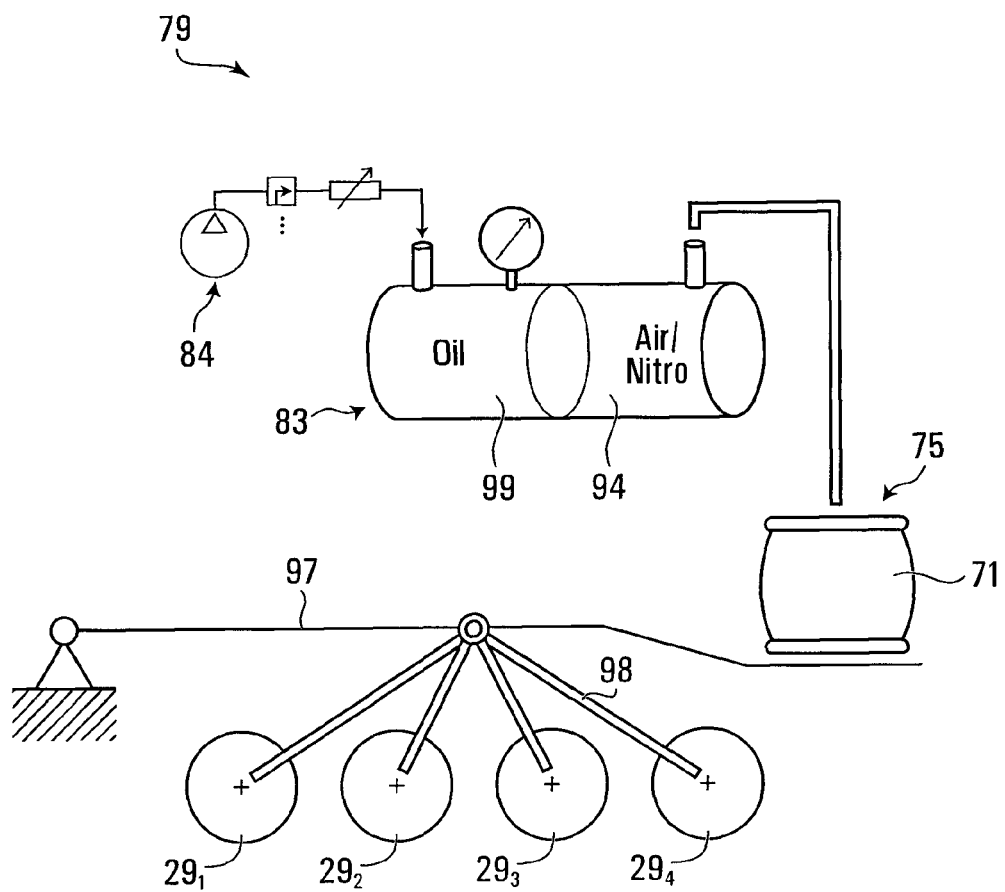

With additional reference to FIG. 9B, in this embodiment, the suspension control system 79 comprises an accumulator 83 connected between the gas spring 71 and a pump 84. The accumulator 83, which is a type of hydro-pneumatic accumulator, comprises a gas chamber 94 containing gas (e.g., air or an inert gas such as nitrogen) that can be exchanged with the gas spring 71 and a hydraulic chamber 99 containing hydraulic fluid (e.g., oil) that can flow in a hydraulic line in fluid communication with the pump 84. A partition (e.g., an elastic diaphragm, a floating piston, etc.) separates the gas chamber 94 and the hydraulic chamber 99. The pump 84 may be used to vary a volume of hydraulic fluid in the hydraulic chamber 99 of the accumulator 83, which in turns varies pressure of the gas in the gas chamber 94 of the accumulator 83, which dictates the pressure of the gas in the gas spring 71 and, therefore, the stiffness of the gas spring 71. A valve 76 may be controlled to allow the volume of hydraulic fluid in the hydraulic chamber 99 to be varied via the pump 84. A hydraulic reservoir (not shown) may be connected to the pump 84 to vary the volume of hydraulic fluid in the hydraulic chamber 99 of the accumulator 83.

The suspension controller 30 may be implemented in any suitable manner. For example, in this embodiment, the suspension controller 30 is an electronic controller that comprises suitable hardware and/or software (e.g., firmware) configured to implement its functionality. The suspension controller 30 comprises an interface 62, a processing portion 37, and a memory portion 39.

The interface 62 allows the suspension controller 30 to receive inputs from and release outputs to other components of the vehicle 10 to which the suspension controller 30 is connected (i.e., directly or indirectly connected to), such as, for instance, the prime mover 14, the user interface 46, and one or more sensors (e.g., a sensor sensing a speed of the vehicle 10 on the ground; a sensor sensing a roughness of the ground; a sensor sensing a load on the vehicle 10; etc.).

The processing portion 37 comprises one or more processors for performing processing operations that implement functionality of the suspension controller 30. A processor of the processing portion 37 may be a general-purpose processor executing program code stored in the memory portion 39. Alternatively, a processor of the processing portion 37 may be a specific-purpose processor comprising one or more preprogrammed hardware or firmware elements (e.g., application-specific integrated circuits (ASICs), electrically erasable programmable read-only memories (EEPROMs), etc.) or other related elements.

The memory portion 39 comprises one or more memories for storing program code executed by the processing portion 37 and/or data used during operation of the processing portion 37. A memory of the memory portion 39 may be a semiconductor memory (e.g., read-only memory (ROM) and/or random-access memory (RAM)), a magnetic storage medium, an optical storage medium, and/or any other suitable type of memory.

The suspension controller 30 is operative to control other components of the suspension control system 79, such as the pump 84 and/or the valve 76, such that the suspension 74 operates as desired. In this embodiment, the suspension controller 30 thus controls other components of the suspension control system 79, such as the pump 84 and/or the valve 76, to regulate the stiffness of the gas spring 71. To that end, the suspension controller 30 may send signals to other components of the suspension control system 79, such as the pump 84 and/or the valve 76, to control their action.

In some embodiments, the suspension controller 30 may control the stiffness of the gas spring 71 autonomously (i.e., without user input). For example, the suspension controller 30 may control the stiffness of the gas spring 71 based on inputs received from one or more sensors (e.g., a sensor sensing a speed of the vehicle 10 on the ground; a sensor sensing a roughness of the ground; a sensor sensing a load on the vehicle 10; a sensor sensing a load on a mid-roller, etc.). The suspension controller 30 may implement a logic that determines what the stiffness of the gas spring 71 should be based on the received inputs and proceeds to send signals to other components of the suspension control system 79, such as the pump 84 and/or the valve 76, to control their action such that the desired stiffness is achieved.

For example, in some embodiments, a load born by the vehicle 10 may be sensed and communicated to the suspension controller 30 which controls the stiffness of the gas spring 17 as a function of the load born by the vehicle 10. For instance, in some cases, the suspension controller 30 may control the stiffness of the gas spring 71 such that, the greater is the load born by the vehicle 10, the greater is the stiffness of the gas spring 71, thereby using more the mid-rollers $29_1$-$29_4$ rolling on top of the guide/drive lugs $48_1$-$48_N$. A sensor (e.g., a scale and bascule element or any other suitable sensor) may be provided on a main axle of the vehicle 10 or at any other suitable location to sense the load born by the vehicle 10.

As another example, in some embodiments, a load born by a given one of the mid-rollers $28_1$-$28_8$, $29_1$-$29_4$ may be sensed and communicated to the suspension controller 30 which controls the stiffness of the gas spring 17 as a function of the load born by the given one of the mid-rollers $28_1$-$28_8$, $29_1$-$29_4$. For instance, in some cases, the suspension controller 30 may control the stiffness of the gas spring 71 such that, the greater is the load born by the given one of the mid-rollers $28_1$-$28_8$, $29_1$-$29_4$, the greater is the stiffness of the gas spring 71, thereby using more the mid-rollers $29_1$-$29_4$ rolling on top of the guide/drive lugs $48_1$-$48_N$. A sensor (e.g., a strain gauge) may be provided on an axle of the given one of the mid-rollers $28_1$-$28_8$, $29_1$-$29_4$ or at any other suitable location to sense the load born by the given one of the mid-rollers $28_1$-$28_8$, $29_1$-$29_4$.

Alternatively or additionally, in some embodiments, the suspension controller 30 may control the stiffness of the gas spring 71 based on user input. For example, the suspension controller 30 may control the stiffness of the gas spring 71 based on user input provided by a user via the user interface 46 of the operator cabin 20 of the vehicle 10. The suspension controller 30 may enable the user to select a particular level of stiffness for the suspension 74 via the user interface 46. For instance, the user interface 46 may provide one or more buttons, switches or other control elements that the user can act upon to choose from different predetermined levels of stiffness for the suspension 74 (e.g., "high" or "low" stiffness) and/or specify a desired stiffness level (e.g., increase or decrease the stiffness to a desired level). The suspension controller 30 may implement a logic that determines what the stiffness of the gas spring 71 should be based on the received user input and proceeds to send signals to other components of the suspension control system 79, such as the pump 84 and/or the valve 76, to control their action such that the desired stiffness is achieved. In some embodiments, instead of or in addition to the user interface 46 of the operator cabin 20, the vehicle 10 may comprise another user interface (e.g., a control panel proximate to the track assembly $16_i$) that can be used by the user to select a particular level of stiffness for the suspension 74.

The suspension controller 30 may be implemented in various other ways in other embodiments. For example, in other embodiments, the suspension controller 30 may be a purely mechanical controller (e.g., a lever manually operable to control the pump 84 or the valve 76) or an electromechanical controller (e.g., a push-button manually operable to activate a solenoid or other mechanism controlling the pump 84 or the valve 76).

Instead of or in addition to controlling operation of the suspension 74 by controlling the stiffness of the spring 71 as discussed above, in some embodiments, the suspension control system 79 and its suspension controller 30 may control operation of the suspension 74 by controlling a baseline position of each of the mid-rollers $29_1$-$29_4$ rolling on top of the guide/drive lugs $48_1$-$48_N$ relative to the mid-rollers $28_1$-$28_8$ rolling on the rolling paths $33_1$, $33_2$ of the carcass 36 of the track 22 in the height direction of the track assembly $16_i$. For instance, in some examples of implementation, the suspension control system 79 may be configured to lower the baseline position of each of the mid-rollers $29_1$-$29_4$ rolling on top of the guide/drive lugs $48_1$-$48_N$ when it is desired to have the mid-rollers $29_1$-$29_4$ rolling on top of the guide/drive lugs $48_1$-$48_N$ bear more of the load on the track assembly $16_i$, and to raise the baseline position of each of the mid-rollers $29_1$-$29_4$ rolling on top of the guide/drive lugs $48_1$-$48_N$ when it is desired to have the mid-rollers $29_1$-$29_4$ rolling on top of the guide/drive lugs $48_1$-$48_N$ bear less of the load on the track assembly $16_i$. The baseline position of each of the mid-rollers $29_1$-$29_4$ rolling on top of the guide/drive lugs $48_1$-$48_N$ may be adjusted by controlling the spring 71.

The track assembly $16_i$ may be configured in various other ways in other embodiments.

For instance, while in embodiments considered above there are four mid-rollers $29_1$-$29_4$ rolling on the top surfaces 86 of the guide/drive lugs $48_1$-$48_N$, there may be any suitable number of mid-rollers rolling on the top surfaces 86 of the guide/drive lugs $48_1$-$48_N$ in other embodiments. Similarly, in other embodiments, the track assembly $16_i$ may comprise any suitable number of mid-rollers which roll on the inner surface 53 of the carcass 36 of the track 22 such as the mid-rollers $28_1$-$28_8$.

Figure 10:
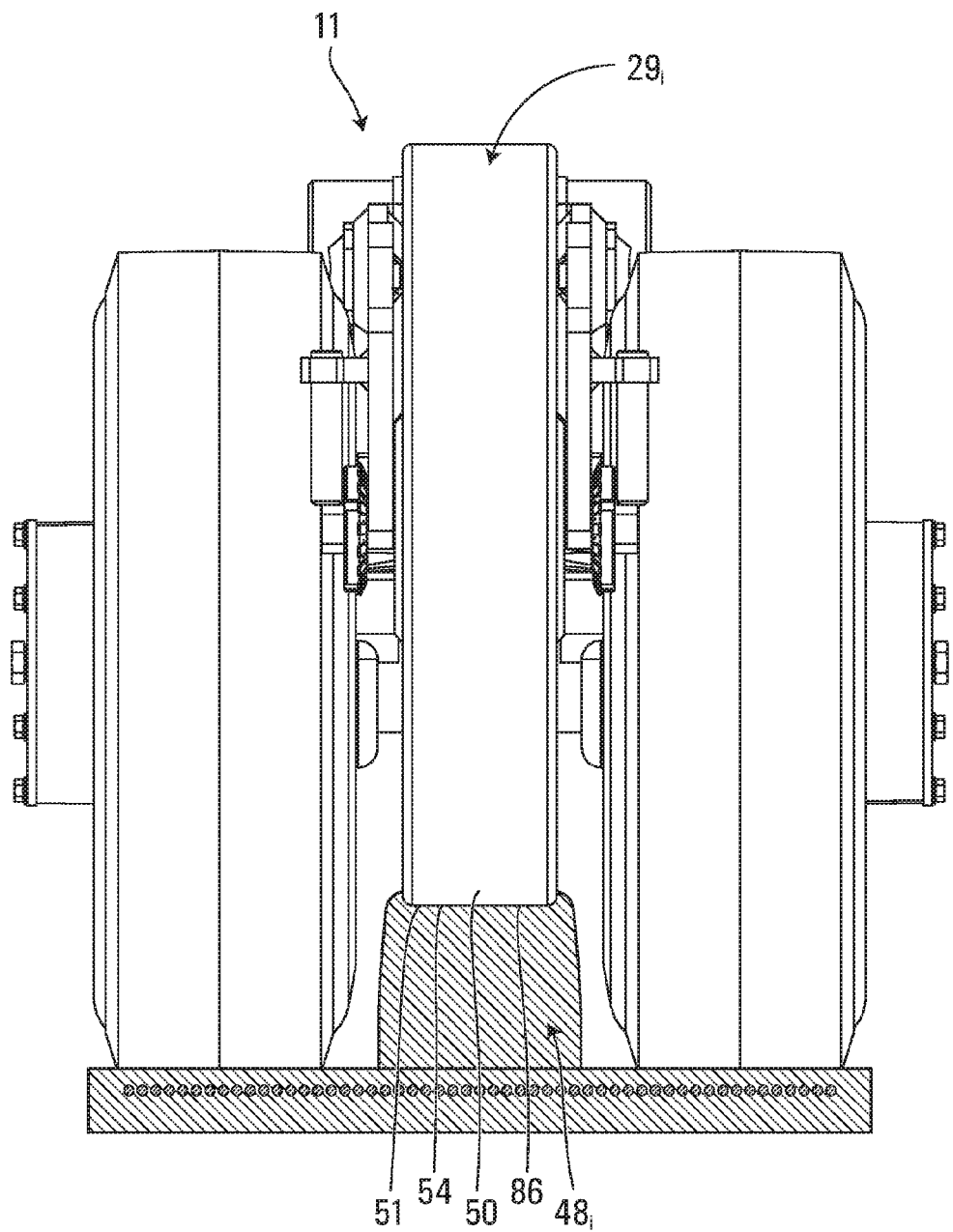
FIG. 10 shows a transversal view of a variant of the track assembly in accordance with another embodiment of the invention.

While in embodiments considered above the interface between a mid-roller $29_i$ and a guide/drive lug $48_i$ is substantially flat, in other embodiments, the interface between the mid-roller $29_i$ and the guide/drive lug $48_i$ may be uneven. For instance, in some cases, this may facilitate alignment of the mid-roller $29_i$ on the guide/drive lug $48_i$ as it rolls on the top surface 86 of the guide/drive lug $48_i$. For example, in some embodiments, as shown in FIG. 10, a portion 50 of a given one of (i) the rolling surface 54 of the mid-roller $29_i$ and (ii) the top surface 86 of the guide/drive lug $48_i$ may extend into a recess 51 of the other one of (i) the rolling surface 54 of mid-roller $29_i$ and (ii) the top surface 86 of the guide/drive lug $48_i$ to facilitate alignment. In this embodiment, the portion 50 is a portion of the rolling surface 54 of the mid-roller $29_i$ and the recess 51 is part of the top surface 86 of the guide/drive lug $48_i$. Here, the portion 50 of the rolling surface 54 of the mid-roller $29_i$ corresponds to an entirety of a width of the rolling surface 54. In other cases, the portion 50 of the rolling surface 54 of the mid-roller $29_i$ may correspond to less than the width of the rolling surface 54 (e.g., the portion 50 may constitute a rib, flange or other projection of the mid-roller $29_i$ projecting towards and into the recess 51 of the guide/drive lug $48_i$). In other embodiments, the portion 50 may be a portion of the top surface 86 of the guide/drive lug $48_i$ that extends into the recess 51 which is formed by the rolling surface 54 of the mid-roller $29_i$.

Although in embodiments considered above the mid-rollers $29_1$-$29_4$ are separate from the mid-rollers $28_1$-$28_8$, in other embodiments, a mid-roller $29_i$ rolling on the top surfaces 86 of the guide/drive lugs $48_1$-$48_N$ may be integrated with one or more of the mid-rollers $28_1$-$28_8$ that roll on the rolling paths $33_1$, $33_2$ of the inner side 45 of the track 22. Thus, (i) a mid-roller $29i$ rolling on the top surfaces 86 of the guide/drive lugs $48_1$-$48_N$ and (ii) a mid-roller $28_i$ rolling on the rolling path $33_1$ and/or a mid-roller $28_i$ rolling on the rolling path $33_2$ may constitute different roller wheel portions of a common roller wheel.

Figure 11:
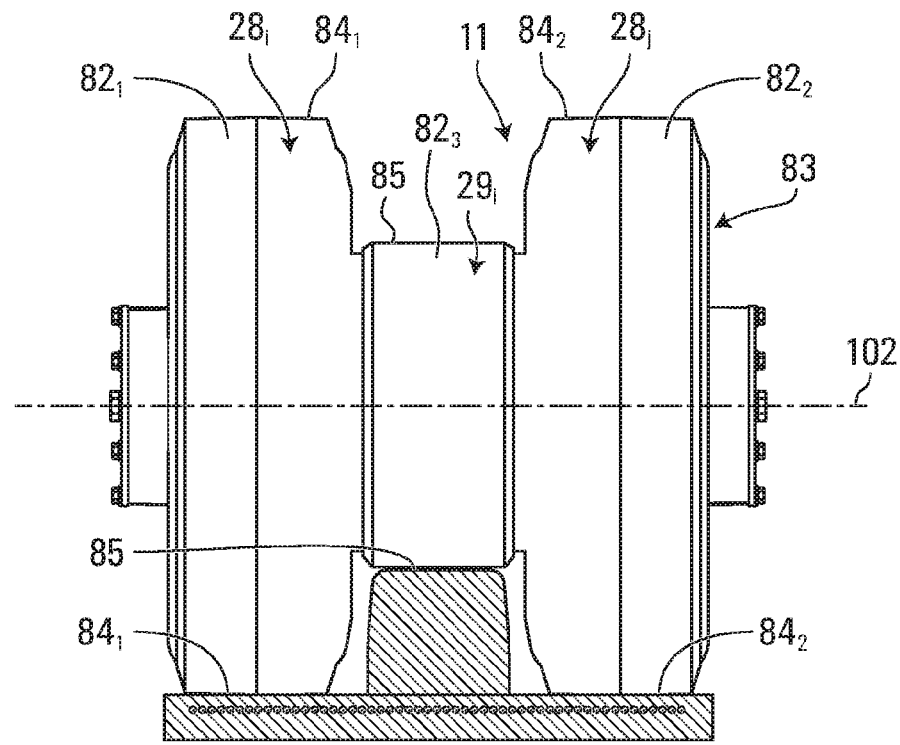
FIG. 11 shows a transversal view of another variant of the track assembly in accordance with another embodiment of the invention.
Figure 12:
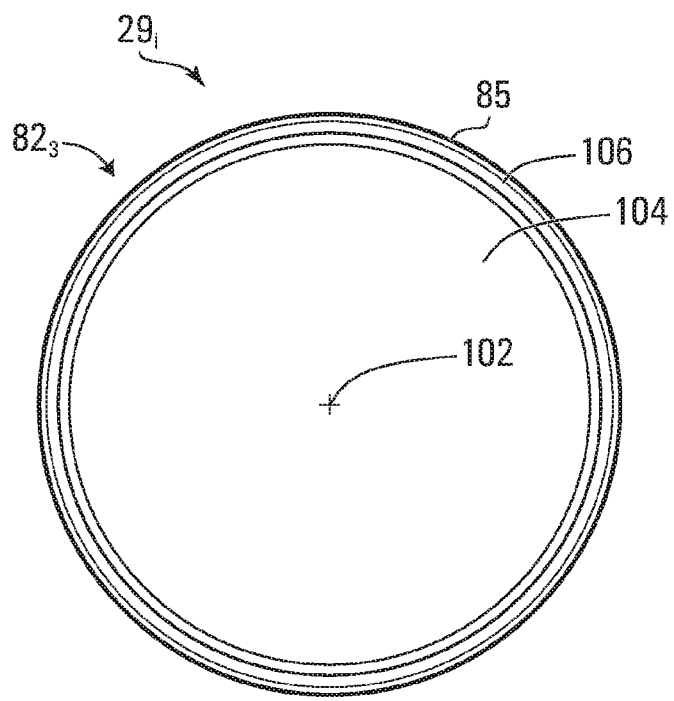
FIG. 12 shows a roller wheel portion of the track assembly shown in FIG. 11.

For example, in some embodiments, as shown in FIGS. 11 and 12, a mid-roller $29_i$ rolling on the top surfaces 86 of the guide/drive lugs $48_1$-$48_N$, a mid-roller $28_i$ rolling on the rolling path $33_1$, and a mid-roller $28_i$ rolling on the rolling path $33_2$ may constitute different roller wheel portions $82_1$-$82_3$ of a common roller wheel 83 having an axis of rotation 102. The roller wheel portions $82_1$, $82_2$ comprise lateral rolling surfaces $84_1$, $84_2$ of the common roller wheel 83 that roll on the rolling paths $33_1$, $33_2$ of the inner side 45 of the track 22, while the roller wheel portion $82_3$ comprises a central rolling surface 85 that rolls on the top surfaces 86 of the guide/drive lugs $48_1$-$48_N$. In this embodiment, the central rolling surface 85 of the roller wheel portion $82_3$ is rotatable relative to a core 104 of the roller wheel portion $82_3$ such that a tangential velocity of the central rolling surface 85 can match a velocity of the top surface 86 of each guide/drive lugs $48_i$. For instance, in this case, the central rolling surface 85 is an outer surface of a sleeve or bearing 106 rotatable around the core 104 of the roller wheel portion $82_3$.

Figure 13:
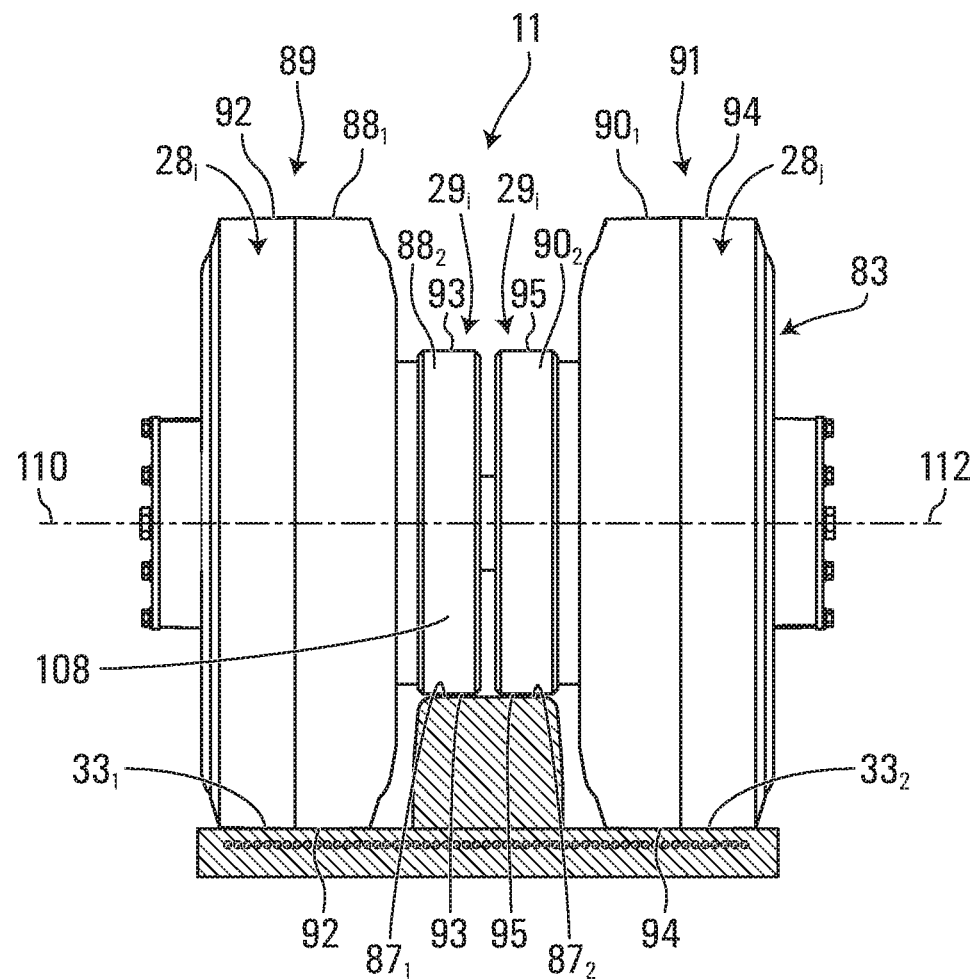
FIG. 13 shows a transversal view of another variant of the track assembly in accordance with another embodiment of the invention.

As another example, in some embodiments, as shown in FIG. 13, a mid-roller $29_i$ rolling on a first lateral area $87_1$ of the top surfaces 86 of the guide/drive lugs $48_1$-$48_N$ and a mid-roller $28_i$ rolling on the rolling path $33_1$ may constitute different roller wheel portions $88_1$, $88_2$ of a common roller wheel 89 having an axis of rotation 110 and a mid-roller $29_j$ rolling on a second lateral area $87_2$ of the top surfaces 86 of the guide/drive lugs $48_1$-$48_N$ and a mid-roller $28_j$ rolling on the rolling path $33_2$ may constitute different roller wheel portions $90_1$, $90_2$ of a common roller wheel 91 having an axis of rotation 112. The roller wheel portion $88_1$ comprises a lateral rolling surface 92 of the common roller wheel 89 that rolls on the rolling path $33_1$ of the inner side 45 of the track 22 and the roller wheel portion $88_2$ comprises a central rolling surface 93 that rolls on the first lateral area $87_1$ of the top surfaces 86 of the guide/drive lugs $48_1$-$48_N$. The roller wheel portion $90_1$ comprises a lateral rolling surface 94 of the common roller wheel 91 that rolls on the rolling path $33_2$ of the inner side 45 of the track 22 and the roller wheel portion $90_2$ comprises a central rolling surface 95 that rolls on the second lateral area $87_2$ of the top surfaces 86 of the guide/drive lugs $48_1$-$48_N$. In this example, the roller wheel portions $88_2$, $90_2$ form flanges that projects inwardly from the roller wheel portions $88_1$, $90_1$ towards the guide/drive lugs $48_1$-$48_N$. In this embodiment, the central rolling surface 93 of the roller wheel portion $88_2$ is rotatable relative to a core of the roller wheel portion $88_2$ such that a tangential velocity of the central rolling surface 93 can match velocity of the top surface 86 of each guide/drive lugs $48_i$. For instance, in this case, the central rolling surface 93 is an outer surface of a sleeve or bearing 108 rotatable around the core of the roller wheel portion $88_2$. The roller wheel portion $90_2$ is constructed in a similar manner.

Figure 15:
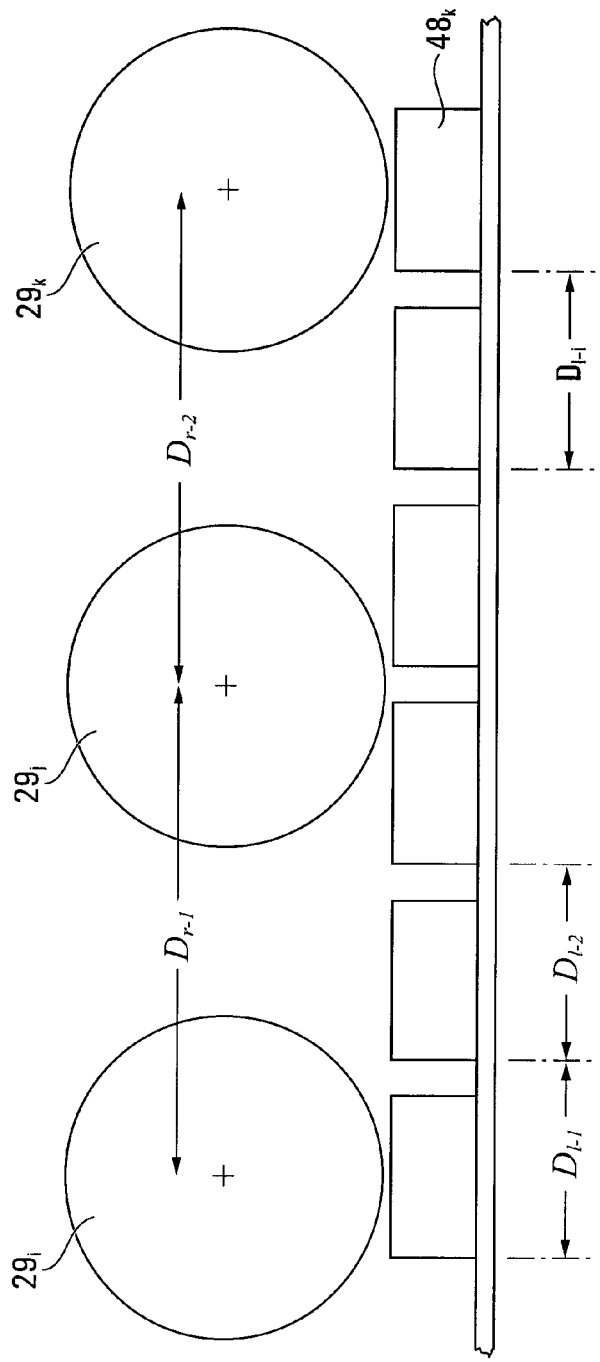
FIG. 15 illustrates a relationship between roller wheels and guide/drive lugs of the endless track.

In some embodiments, as shown in FIG. 15, to reduce vibrations and/or improve ride quality, the mid-rollers $29_1$-$29_4$ rolling on top of the guide/drive lugs $48_1$-$48_N$ may be positioned relative to one another to avoid all of them simultaneously reaching respective ones of the gaps $31_1$-$31_M$ between successive ones of the guide/drive lugs $48_1$-$48_N$. This may thus prevent all the mid-rollers $29_1$-$29_4$ from dropping in the gaps $31_1$-$31_M$ between successive ones of the guide/drive lugs $48_1$-$48_N$ at the same time. For example, the mid-rollers $29_1$-$29_4$ are positioned relative to one another such that, when a given one of the mid-rollers $29_1$-$29_4$ reaches a particular one of the gaps $31_1$-$31_M$, another one of the mid-rollers $29_1$-$29_4$ (in this case, every other one of the mid-rollers $29_1$-$29_4$) is not reaching any one of the gaps $31_1$-$31_M$. For instance, in some embodiments, a spacing $D_r$ of adjacent ones of the mid-rollers $29_1$-$29_4$ may not correspond to a multiple of a pitch $D_l$ of adjacent ones of the guide/drive lugs $48_1$-$48_N$. As indicated in FIG. 15, this can be achieved by selecting the spacing $D_r$ of adjacent ones of the mid-rollers $29_1$-$29_4$ and the pitch $D_l$ of adjacent ones of the guide/drive lugs $48_1$-$48_N$. In some cases, the spacing $D_{r-1}$ of two adjacent mid-rollers $29_i$, $29_j$ may be different from the spacing $D_{r-2}$ of two other adjacent mid-rollers $29_j$, $29_k$ and/or the pitch $D_{l-1}$ of two adjacent guide/drive lugs $48_i$, $48_j$ may be different from the pitch $D_{l-2}$ of two other adjacent guide/drive lugs $48_j$, $48_k$.

Figure 16:
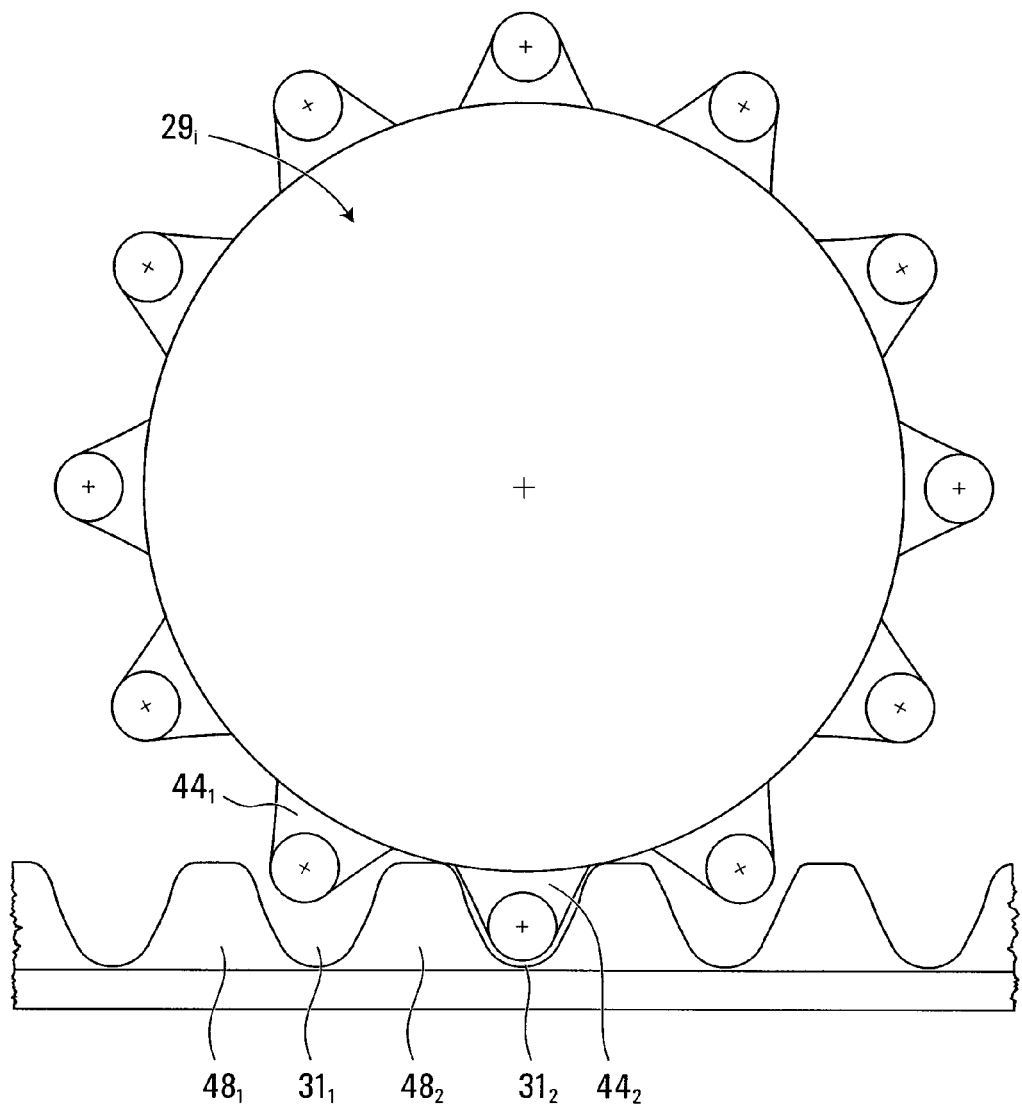
FIG. 16 shows a variant of a roller wheel in accordance with another embodiment of the invention.

In some embodiments, as shown in FIG. 16, in addition to rolling on the top surfaces 86 of the guide/drive lugs $48_1$-$48_N$, a mid-roller $29_i$ may be a sprocket comprising teeth $44_1$-$44_T$ that mesh in the gaps $31_1$-$31_M$ between successive ones of the guide/drive lugs $48_1$-$48_N$ as the rolling surface 54 of the mid-roller $29_i$ rolls on the top surfaces 86 of the guide/drive lugs $48_1$-$48_N$. For instance, this may be useful in embodiments in which the guide/drive lugs $48_1$-$48_N$ are drive lugs for driving the track 22 (i.e., a positive drive system). A pitch of the teeth $44_1$-$44_T$ of the mid-roller $29_i$ may be selected based on a pitch of the guide/drive lugs $48_1$-$48_N$ to ensure a proper meshing engagement.

Figure 17:
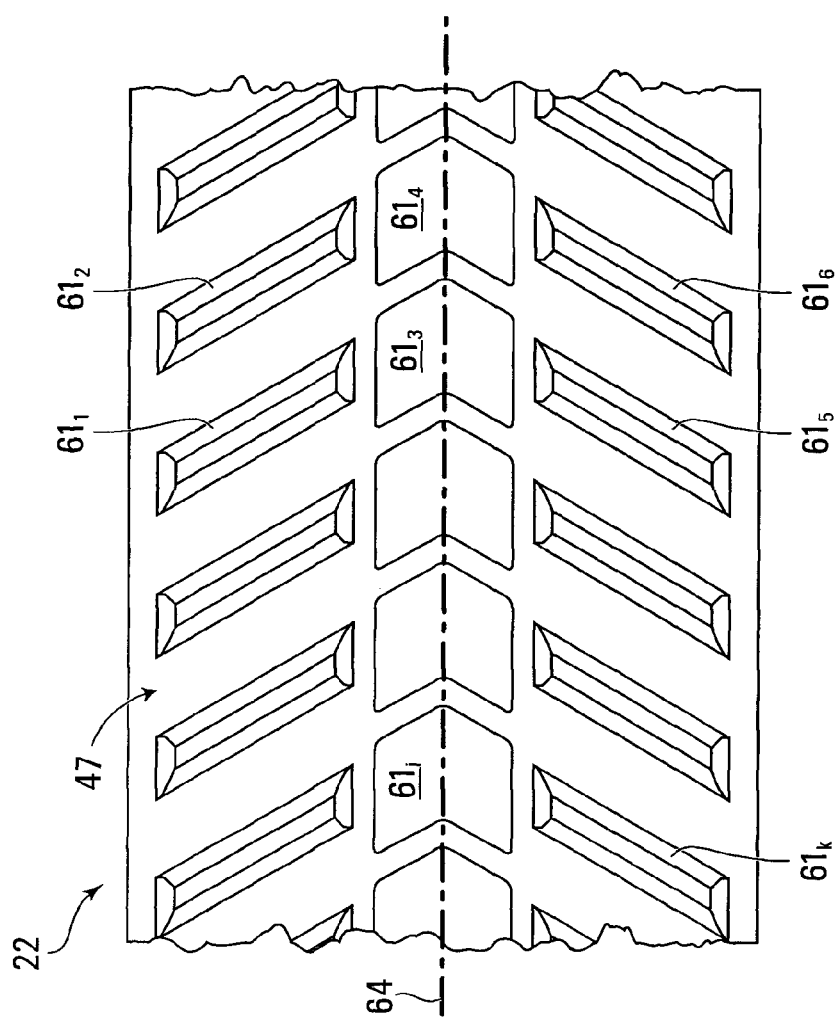
FIGS. 17 and 18 respectively show variants of a tread pattern of the ground-engaging outer side of the endless track in accordance with other embodiments of the invention.
Figure 18:
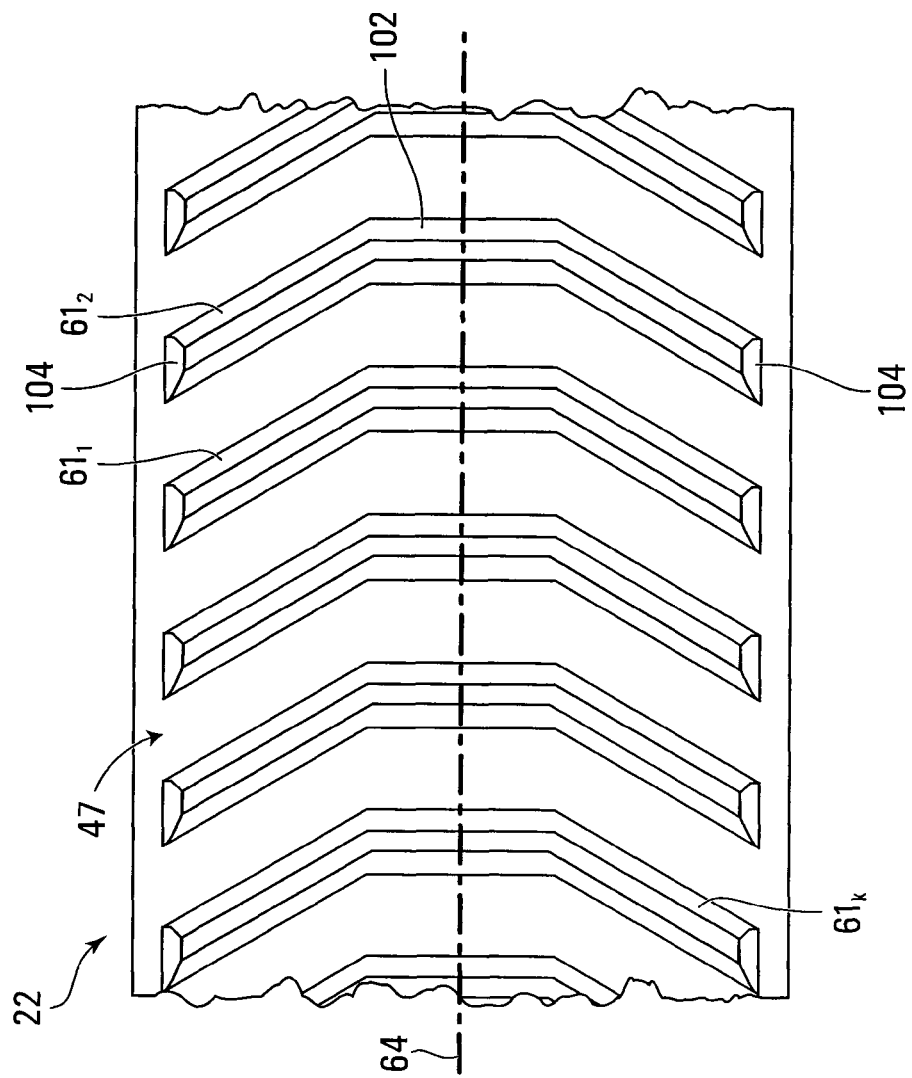

The tread pattern 40 of the ground-engaging outer side 47 of the endless track 22 may be designed taking into account presence of the mid-rollers $29_1$-$29_4$ rolling on the top surfaces 86 of the guide/drive lugs $48_1$-$48_N$. For example, in some embodiments, as shown in FIG. 17, respective ones of the traction projections $61_1$-$61_M$ overlap with the top surfaces 86 of the guide/drive lugs $48_1$-$48_N$ in the widthwise direction of the track 22 to transfer forces applied by the mid-rollers $29_1$-$29_4$ to the top surfaces 86 of the guide/drive lugs $48_1$-$48_N$ onto the ground. This may enhance ride quality, comfort, and load distribution on the ground. This may also help to reduce wear of the traction projections $61_1$-$61_M$ in view of the increased contact area with the ground. In this embodiment, the respective ones of the traction projections $61_1$-$61M$ that overlap with the top surfaces 86 of the guide/drive lugs $48_1$-$48_N$ in the widthwise direction of the track 22 extend over a centerline 64 of the track 22 which bisects the track's width. In this case, the respective ones of the traction projections $61_1$-$61_M$ that overlap with the top surfaces 86 of the guide/drive lugs $48_1$-$48_N$ in the widthwise direction of the track 22 are central traction projections which are separated from lateral ones of the traction projections $61_1$-$61_M$. In other cases, as shown in FIG. 18, the respective ones of the traction projections $61_1$-$61_M$ that overlap with the top surfaces 86 of the guide/drive lugs $48_1$-$48_N$ in the widthwise direction of the track 22 may include a central portion 102 contiguous with one or more lateral portions 104.

Although in embodiments considered above the load distributor 11 of the track assembly $16_i$ which provides enhanced load distribution on the endless track 22 comprises the mid-rollers $29_1$-$29_4$, in other embodiments, the load distributor 11 may be configured in various other ways. For example, in some embodiments, the load distributor 11 may comprise a slider for being in sliding contact with the top surfaces 86 of the guide/drive lugs $48_1$-$48_N$ to apply loading on the guide/drive lugs $48_1$-$48_N$. The slider may comprises an elongated structure (e.g., a bar, beam or rail) that spans respective ones of the guide/drive lugs $48_1$-$48_N$. The slider may have a low-friction surface (e.g., comprising polytetrafluoroethylene (PTFE) or another fluoropolymer, or any other suitable low-friction material) in sliding contact with the top surfaces 86 of the guide/drive lugs $48_1$-$48_N$. The slider may be coupled to the suspension 74 and the suspension control system 79 as discussed above in relation to the mid-rollers $29_1$-$29_4$.

Figure 14:
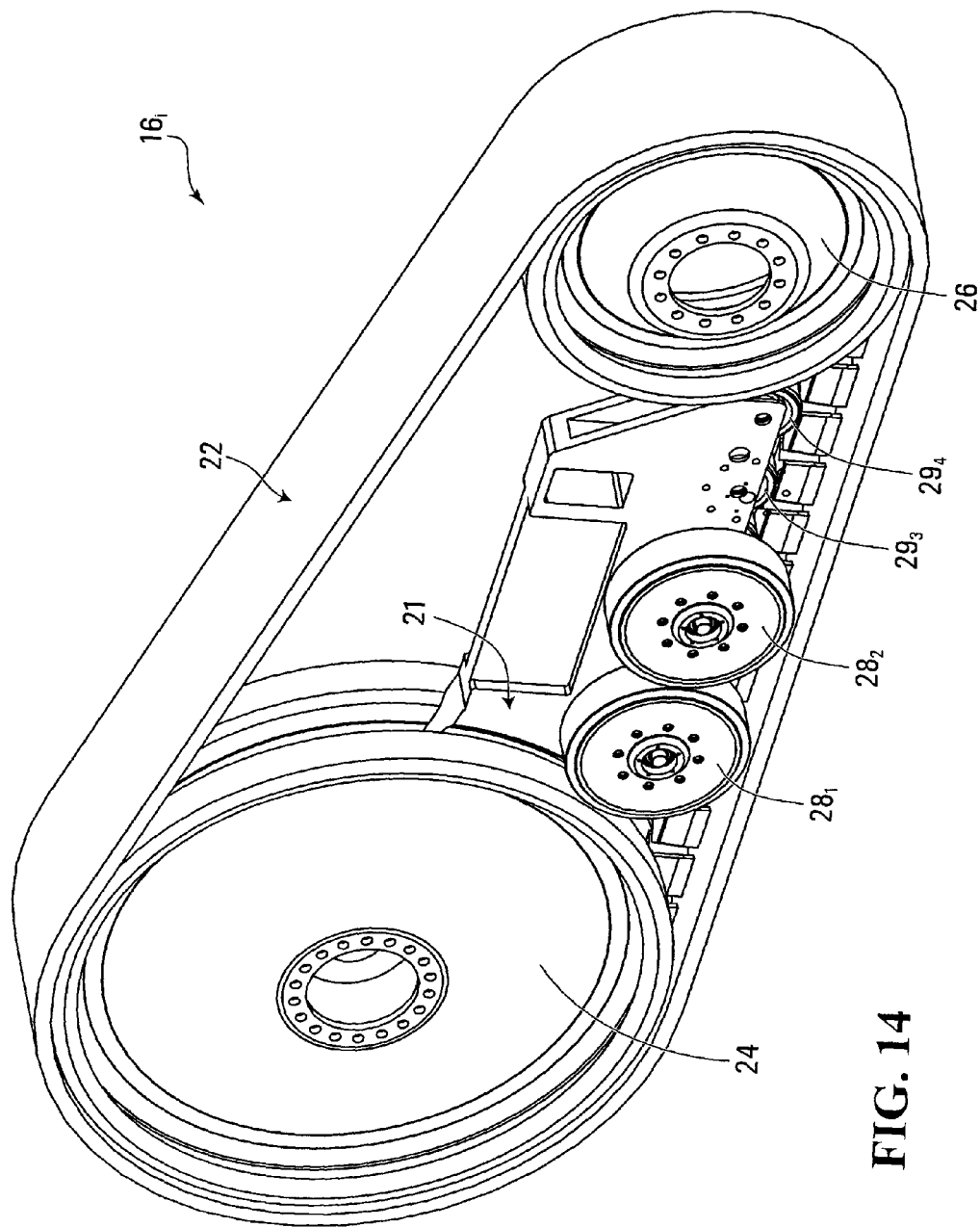
FIG. 14 shows a perspective view of a variant of the track assembly in accordance with another embodiment of the invention.

The track assembly $16_i$ may have a different overall configuration in other embodiments. For example, in some embodiments, as shown in FIG. 14, the track assembly $16_i$ may have a generally triangular configuration in which the drive wheel 24 is much larger than the idler wheel 26.

While in the embodiments considered above the off-road vehicle 10 is an agricultural vehicle, in other embodiments, the vehicle 10 may be another type of work vehicle such as a construction vehicle (e.g., a loader, a bulldozer, an excavator, an asphalt paver, etc.) for performing construction work, a forestry vehicle (e.g., a feller-buncher, a tree chipper, a knuckleboom loader, etc.) for performing forestry work, or a military vehicle (e.g., a combat engineering vehicle (CEV), etc.) for performing military work, or may be any other type of vehicle operable off paved roads. Although operable off paved roads, the vehicle 10 may also be operable on paved roads in some cases. Also, while in the embodiments considered above the off-road vehicle 10 is driven by a human operator in the vehicle 10, in other embodiments, the vehicle 10 may be an unmanned ground vehicle (e.g., a teleoperated or autonomous unmanned ground vehicle).

Any feature of any embodiment discussed herein may be combined with any feature of any other embodiment discussed herein in some examples of implementation. Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A track assembly for traction of an off-road vehicle, the track assembly comprising a set of wheels and an endless track disposed around the set of wheels, the endless track being elastomeric to flex around the set of wheels, the endless track comprising:
   i. an inner side facing the set of wheels, the inner side comprising a plurality of drive/guide lugs projecting inwardly, each drive/guide lug being at least mainly made of elastomeric material; and
   ii. a ground-engaging outer side for engaging the ground, the ground-engaging outer side comprising a plurality of traction lugs projecting outwardly;
   wherein the set of wheels comprises:
      a drive wheel for imparting motion to the endless track;
      a first plurality of roller wheels for rolling on a first rolling path of the inner side and a second plurality of roller wheels for rolling on a second rolling path of the inner side, the drive/guide lugs being located between the first rolling path and the second rolling path; and
      a third plurality of roller wheels for rolling on top of the drive/guide lugs.

2. A track assembly for traction of an off-road vehicle, the track assembly comprising:
   a) a set of wheels comprising a drive wheel, a first plurality of roller wheels and a second plurality of roller wheels;
   b) an endless track disposed around the set of wheels, the endless track being elastomeric to flex around the set of wheels, the endless track comprising:
      i. an inner side facing the set of wheels, the inner side comprising a plurality of drive/guide lugs projecting inwardly, each drive/guide lug being at least mainly made of elastomeric material; and
      ii. a ground-engaging outer side for engaging the ground, the ground-engaging outer side comprising a plurality of traction lugs projecting outwardly;
      the drive wheel being rotatable for imparting motion to the endless track, each of the first plurality of roller wheels being rotatable for rolling on a first rolling path of the inner side, each of the second plurality of roller wheels being rotatable for rolling on a second rolling path of the inner side, the drive/guide lugs being located between the first rolling path and the second rolling path; and c) a load distributor for contacting top surfaces of the drive/guide lugs to apply loading on the drive/guide lugs.

3. The track assembly of claim 2, wherein the load distributor comprises a third plurality of roller wheels for rolling on the top surfaces of the drive/guide lugs.

4. The track assembly of claim 3, wherein the drive/guide lugs are shaped such that a each roller wheel of the third plurality of roller wheels rolling on the top surface of a given one of the drive/guide lugs comes into contact with the top surface of a succeeding one of the drive/guide lugs before leaving the top surface of the given one of the drive/guide lugs.

5. The track assembly of claim 3, wherein a ratio of a distance in a longitudinal direction of the track assembly between consecutive ones of the drive/guide lugs and a diameter of each roller wheel of the third plurality of roller wheels is no more than 0.15.

6. The track assembly of claim 3, wherein each roller wheel of the third plurality of roller wheels comprises different materials.

7. The track assembly of claim 3, wherein each roller wheel of the third plurality of roller wheels comprises polymeric material to contact the top surfaces of the drive/guide lugs.

8. The track assembly of claim 3, wherein a portion of a given one of (i) a rolling surface of each roller wheel of the plurality of roller wheels and (ii) the top surface of each drive/guide lug extends into a recess of the other one of (i) the rolling surface of the roller wheel and (ii) the top surface of the drive/guide lug.

9. The track assembly of claim 2, wherein a load-bearing area of the inner side of the endless track bearing load from the first plurality of roller wheels, the second plurality of roller wheels and the load distributor is at least 70% of a theoretical load-bearable area of the inner side of the endless track.

10. The track assembly of claim 2, wherein a load-bearing area of the inner side of the endless track bearing load from the first plurality of roller wheels, the second plurality of roller wheels and the load distributor is at least 80% of a theoretical load-bearable area of the inner side of the endless track.

11. The track assembly of claim 2, wherein a load-bearing area of the inner side of the endless track bearing load from the first plurality of roller wheels, the second plurality of roller wheels and the load distributor is at least 10% greater than if the load distributor was omitted but the track assembly was otherwise identical.

12. The track assembly of claim 2, wherein a load-bearing area of the inner side of the endless track bearing load from the first plurality of roller wheels, the second plurality of roller wheels and the load distributor is at least 20% greater than if the load distributor was omitted but the track assembly was otherwise identical.

13. The track assembly of claim 2, wherein a load-bearing widthwise extent of the inner side of the endless track bearing load from the first plurality of roller wheels, the second plurality of roller wheels and the load distributor is at least 70% of a width of the endless track.

14. The track assembly of claim 2, wherein a load-bearing widthwise extent of the inner side of the endless track bearing load from the first plurality of roller wheels, the second plurality of roller wheels and the load distributor is at least 80% of a width of the endless track.

15. The track assembly of claim 2, wherein a load-bearing widthwise extent of the inner side of the endless track bearing load from the first plurality of roller wheels, the second plurality of roller wheels and the load distributor is at least 10%) greater than if the load distributor was omitted but the track assembly was otherwise identical.

16. The track assembly of claim 2, wherein a load-bearing widthwise extent of the inner side of the endless track hearing load from the first plurality of roller wheels, the second plurality of roller wheels and the load distributor is at least 20% greater than if the load distributor was omitted but the track assembly was otherwise identical.

17. The track assembly of claim 2, wherein a width of the track is less than 24 inches.

18. The track assembly of claim 2, wherein a width of the track is about 16 inches.

19. The track assembly of claim 2, wherein a peak ground pressure of the endless track on the around is at least 10% lower than if the load distributor was omitted but the track assembly was otherwise identical.

20. The track assembly of claim 2, wherein a peak around pressure of the endless track on the ground is at least 20% lower than if the load distributor was omitted but the track assembly was otherwise identical.

21. The track assembly of claim 2, wherein a ratio of a load-bearing capacity of the track assembly over a peak ground pressure of the endless track on the ground is at least 13 kN/bar.

22. The track assembly of claim 2, wherein a ratio of a load-bearing capacity of the track assembly over a peak around pressure of the endless track on the ground is at least 15 kN/bar.

23. The track assembly of claim 2, wherein a front-to-rear dimension of each drive/guide lug is greater than a side-to-side dimension of the drive/guide lug.

24. The track assembly of claim 3, wherein the drive/guide lugs are shaped such that a rolling path is continuous over successive ones of the drive/guide lugs for the third plurality of roller wheels.

25. The track assembly of claim 2, wherein the drive/guide lugs are shaped to mesh with one another.

26. The track assembly of claim 2, wherein the load distributor is movable relative to at least some of the first plurality of roller wheels and the second plurality of roller wheels in a height direction of the track assembly.

27. The track assembly of claim 26, comprising a resilient device between (i) the load distributor and (ii) the first plurality of roller wheels and the second plurality of roller wheels.

28. The track assembly of claim 2, comprising a first structure carrying at least some of the first plurality of roller wheels and the second plurality of roller wheels and a second structure carrying the load distributor and movable relative to the first structure.

29. The track assembly of claim 28, wherein the second structure is pivotable relative to the first structure.

30. The track assembly of claim 2, wherein the track assembly is controllable to adjust how the loading is distributed among the first plurality of roller wheels, the second plurality of roller wheels, and the load distributor.

31. The track assembly of claim 30, wherein the track assembly is controllable to adjust a ratio of a load borne by the first plurality of roller wheels and the second plurality of roller wheels and a load borne by the load distributor.

32. The track assembly of claim 30, wherein the track assembly is controllable to adjust how the loading is distributed among the first plurality of roller wheels, the second plurality of roller wheels, and the load distributor based on a load born by the vehicle.

33. A track assembly for traction of an off-road vehicle, the track assembly comprising a set of wheels and an endless track disposed around the set of wheels, the endless track being elastomeric to flex around the set of wheels, the endless track comprising:
  i. an inner side facing the set of wheels, the inner side comprising a plurality of drive/guide lugs projecting inwardly, each drive/guide lug being at least mainly made of elastomeric; and
  ii. a ground-engaging outer side for engaging the ground, the ground-engaging outer side comprising a plurality of traction lugs projecting outwardly;
  wherein the set of wheels comprises a drive wheel for imparting motion to the endless track and a set of roller wheels for rolling on the inner side of the endless track; and
  wherein a load-bearing widthwise extent of the inner side of the endless track bearing load from the set of roller wheels is at least 70% of a width of the endless track.

34. A track assembly for traction of an off-road vehicle, the track assembly comprising a set of wheels and an endless track disposed around the set of wheels, the endless track being elastomeric to flex around the set of wheels, the endless track comprising:
  i. an inner side facing the set of wheels, the inner side comprising a plurality of drive/guide lugs projecting inwardly, each drive/guide lug being at least mainly made of elastomeric; and
  ii. a ground-engaging outer side for engaging the ground, the ground-engaging outer side comprising a plurality of traction lugs projecting outwardly;
  wherein the set of wheels comprises a drive wheel for imparting motion to the endless track and a set of roller wheels for rolling on the inner side of the endless track; and
  wherein a load-bearing area of the inner side of the endless track bearing load from the set of roller wheels is at least 70% of a theoretical load-bearable area of the inner side of the endless track.

35. A track assembly for traction of an off-road vehicle, the track assembly comprising a set of wheels and an endless track disposed around the set of wheels, the endless track being elastomeric to flex around the set of wheels, the endless track comprising:
  i. an inner side facing the set of wheels; and
  ii. a ground-engaging outer side for engaging the ground, the ground-engaging outer side comprising a plurality of traction lugs projecting outwardly;
  wherein the set of wheels comprises a drive wheel for imparting motion to the endless track and a set of roller wheels for rolling on the inner side of the endless track; and
  wherein a load-bearing widthwise extent of the inner side of the endless track bearing load from the set of roller wheels is at least 80% of a width of the endless track.

* * * * *

UNITED STATES PATENT AND TRADEMARK OFFICE
CERTIFICATE OF CORRECTION

PATENT NO. : 9,950,756 B2  
APPLICATION NO. : 14/435380  
DATED : April 24, 2018  
INVENTOR(S) : Kris de Boe and Alain Lussier Page 1 of 1

It is certified that error appears in the above-identified patent and that said Letters Patent is hereby corrected as shown below:

In the Claims

Column 22, Line 7, Claim 15, delete "at least 10%) greater" and insert --at least 10% greater--.

Column 22, Line 24, Claim 20, delete "around" and insert --ground--.

Column 22, Line 34, Claim 22, delete "around" and insert --ground--.

Column 23, Line 15, Claim 33, delete "elastomeric" insert --elastomeric material--.

Column 24, Line 4, Claim 34, delete "elastomeric" insert --elastomeric material--.

Signed and Sealed this  
Fifth Day of February, 2019

Andrei Iancu  
*Director of the United States Patent and Trademark Office*